United States Patent
Chang et al.

(10) Patent No.: US 12,218,996 B2
(45) Date of Patent: Feb. 4, 2025

(54) SYSTEM AND METHOD FOR ACCESSING STREAMING DATA

(71) Applicant: 17LIVE Japan Inc., Tokyo (JP)

(72) Inventors: Yu-Chuan Chang, Taipei (TW); Kun-Ze Li, Taipei (TW); Che-Wei Liu, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 18/090,809

(22) Filed: Dec. 29, 2022

(65) Prior Publication Data

US 2023/0231895 A1 Jul. 20, 2023

Related U.S. Application Data

(63) Continuation of application No. PCT/US2021/073184, filed on Dec. 30, 2021.

(30) Foreign Application Priority Data

Jan. 26, 2022 (JP) .................. 2022-009905
Nov. 24, 2022 (JP) .................. 2022-187749

(51) Int. Cl.
*H04L 65/611* (2022.01)
*H04L 47/125* (2022.01)

(52) U.S. Cl.
CPC .......... *H04L 65/611* (2022.05); *H04L 47/125* (2013.01)

(58) Field of Classification Search
CPC ..... H04L 65/611; H04L 47/125; H04L 65/612
See application file for complete search history.

(56) References Cited

U.S. PATENT DOCUMENTS

2008/0243996 A1* 10/2008 Wu .................. H04L 65/65
709/203
2011/0302320 A1* 12/2011 Dunstan ............ H04L 12/185
370/252

(Continued)

FOREIGN PATENT DOCUMENTS

| CN | 112714186 A | 4/2021 |
|----|-------------|--------|
| JP | 2004-348454 A | 12/2004 |
| JP | 2016-500205 A | 1/2016 |

OTHER PUBLICATIONS

International Search Report dated Mar. 25, 2022, issued in corresponding International Application No. PCT/US2021/073184 (8 pgs.).

(Continued)

*Primary Examiner* — Patrice L Winder
(74) *Attorney, Agent, or Firm* — Chun-Ming Shih; HDLS IPR SERVICES

(57) ABSTRACT

The present disclosure relates to a system and a method for accessing streaming data. The method includes: obtaining, from a first user terminal and via a network, a first request for streaming data; transmitting the first request to a server for accessing the streaming data; recording identification information included in the first request to be corresponding to the server in a table; obtaining, from a second user terminal and via a network, a second request for the streaming data; and transmitting the second request to the server for accessing the streaming data. Identification information included in the second request is the same as the identification information included in the first request.

8 Claims, 17 Drawing Sheets

(56) References Cited

U.S. PATENT DOCUMENTS

| | | | |
|---|---|---|---|
| 2012/0173749 A1* | 7/2012 | Shah | H04L 65/611 |
| | | | 709/231 |
| 2017/0302463 A1* | 10/2017 | Larumbe | H04L 12/18 |
| 2018/0124141 A1* | 5/2018 | Lewis | H04L 65/612 |
| 2018/0309682 A1* | 10/2018 | Larumbe | H04L 47/122 |
| 2019/0069047 A1* | 2/2019 | Wood | H04N 21/2187 |
| 2019/0238897 A1 | 8/2019 | Wei et al. | |
| 2020/0021672 A1 | 1/2020 | Ponec et al. | |
| 2020/0028899 A1 | 1/2020 | Zhou et al. | |
| 2020/0028927 A1* | 1/2020 | Sathyanarayana | H04L 65/60 |
| 2020/0107050 A1* | 4/2020 | Peng | H04L 65/611 |
| 2020/0120150 A1* | 4/2020 | Bongaarts | H04L 65/611 |
| 2020/0314015 A1 | 10/2020 | Mariappan et al. | |
| 2021/0029413 A1* | 1/2021 | Bilal | H04N 21/2393 |
| 2021/0266346 A1 | 8/2021 | Gordon et al. | |
| 2023/0042408 A1* | 2/2023 | Godsey | H04N 21/2393 |
| 2023/0328296 A1* | 10/2023 | Fujiwara | H04L 12/14 |
| | | | 709/204 |

OTHER PUBLICATIONS

Notification of Reasons for Refusal dated Sep. 6, 2022, issued in corresponding Japanese Patent Application No. 2022-009905 with English translation (14 pgs.).

Notification Letter of Review Opinion from the Intellectual Property Bureau of the Ministry of Economic Affairs dated Nov. 24, 2022, issued in corresponding Taiwanese Patent Application No. 110149534 with English translation (14 pgs.).

Notice of Reasons for Refusal dated Dec. 26, 2023, issued in corresponding Japanese Patent Application No. 2022-528295 with English translation (11 pgs.).

\* cited by examiner

Pull Edge Server Table

| Server ID | Stream ID | CPU usage (%) | Memory usage (%) | # of connections |
|---|---|---|---|---|
| SV1 | S1, S2, ... | 60 | 78 | xx |
| SV2 | S5, S6, ... | 90 | 80 | yy |
| ... | ... | ... | ... | ... |

FIG. 4

Stream DB 310

| Stream ID | Distributor ID | Viewer ID |
|---|---|---|
| S22 | 001A | SS5, SS12, SS43 |
| S92 | 002B | TT3, TS2 |
| ... | ... | |

FIG. 8

User DB 312

| User ID | Points |
|---------|--------|
| 001A | 3243 |
| 002B | 2510 |
| SS5 | 1803 |
| ... | ... |

FIG. 9

Gift DB 314

| Gift ID | Awarded points | Price points |
|---|---|---|
| TT01 | 90 | 100 |
| TE01 | 180 | 200 |
| WTS10 | 40 | 50 |
| ... | ... | |

FIG. 10

SYSTEM AND METHOD FOR ACCESSING STREAMING DATA

CROSS-REFERENCE TO RELATED APPLICATIONS

This application is a Bypass Continuation Application claiming the benefit of priority from (i) International Patent Application No. PCT/US2021/073184, filed on Dec. 30, 2021, (ii) Japanese Patent Application No. 2022-009905 (the "JP905 Application"), filed on Jan. 26, 2022, and (iii) Japanese Patent Application No. 2022-187749, filed on Nov. 24, 2022, which claims the benefit of priority from the JP905 Application, the contents of each of which are hereby incorporated by reference in their entirety.

FIELD

The present disclosure relates to accessing data on the Internet and, more particularly, to accessing streaming data on the Internet.

BACKGROUND

Real time data accessing on the Internet, such as live streaming data accessing, has become popular in our daily life. For a system supporting or providing real time data accessing, it is important to efficiently allocate the limited available infrastructures or services, such as server capacity, to potential clients and the contents those clients require to access.

A pull edge server is a server configured to facilitate the data pull from an origin server where the data is stored or received. An origin server may receive streaming data from a streamer/distributor directly or indirectly. In the scenario of streaming data accessing, a plurality of pull edge servers may be deployed between the origin server, wherein the streaming data is stored, and the clients to access the streaming data. A pull edge server would pull data from the origin server and distribute it to clients, thus lowering the burden of the origin server and increasing the number of clients to be served.

In real time data accessing on the internet, such as live streaming data accessing, latency needs to be kept as low as possible. With sub-500 milliseconds of real time latency, web real-time communication (WebRTC) is one of the fastest protocols on the market. WebRTC was essentially built with bidirectional and real-time communication. Unlike HTTP Live Streaming (HLS), which is built with Transmission Control Protocol (TCP), WebRTC is mainly based on User Datagram Protocol (UDP).

SUMMARY

A method according to one embodiment of the present disclosure is a method for accessing streaming data being executed by one or a plurality of computers, and includes: obtaining, from a first user terminal and via a network, a first request for streaming data; transmitting the first request to a server for accessing the streaming data; recording identification information included in the first request to be corresponding to the server in a table; obtaining, from a second user terminal and via a network, a second request for the streaming data; and transmitting the second request to the server for accessing the streaming data. Identification information included in the second request is the same as the identification information included in the first request.

A system according to one embodiment of the present disclosure is a system for accessing streaming data that includes one or a plurality of processors, and the one or plurality of computer processors execute a machine-readable instruction to perform: obtaining, from a first user terminal and via a network, a first request for streaming data; transmitting the first request to a server for accessing the streaming data; recording identification information included in the first request to be corresponding to the server in a table; obtaining, from a second user terminal and via a network, a second request for the streaming data; and transmitting the second request to the server for accessing the streaming data. Identification information included in the second request is the same as the identification information included in the first request.

A load balancer according to one embodiment of the present disclosure is a load balancer for accessing streaming data. The load balancer includes: a storing unit configured to store a stream ID which identifies a currently available live stream and a respective server ID which identifies a server handling the currently available live stream; a receiving unit configured to receive, from a terminal of a user and via a network, a request including a first stream ID; a determining unit configured to determine, in response to receiving the request and by referring to the storing unit, a first server handling a first live stream which is identified by the first stream ID; and a connecting unit configured to cause the determined first server to send live streaming data for the first live stream to the terminal of the user.

A method according to another embodiment of the present disclosure is a method for streaming data accessing being executed by one or a plurality of computers, and includes: transmitting a TCP request for streaming data, obtaining a TCP response containing an identification key, transmitting a UDP request for the streaming data to a space addressable by the identification key, and obtaining the streaming data.

A system according to another embodiment of the present disclosure is a system for streaming data accessing that includes one or a plurality of processors, and the one or plurality of computer processors execute a machine-readable instruction to perform: transmitting a TCP request for streaming data, obtaining a TCP response containing an identification key, transmitting a UDP request for the streaming data to a space addressable by the identification key, and obtaining the streaming data.

A computer-readable medium according to another embodiment of the present disclosure is a non-transitory computer-readable medium including a program for streaming data accessing, and the program causes one or a plurality of computers to execute: transmitting a TCP request for streaming data, obtaining a TCP response containing an identification key, transmitting a UDP request for the streaming data to a space addressable by the identification key, and obtaining the streaming data.

A method according to one embodiment of the present disclosure is a method for streaming data accessing being executed by one or a plurality of computers, and includes: obtaining a TCP request for streaming data, replying a TCP response containing an identification key, obtaining, at a space addressable by the identification key, a UDP request for the streaming data, and transmitting the streaming data.

BRIEF DESCRIPTION OF THE DRAWINGS

FIG. 4 shows an exemplary data structure of the pull edge server table in accordance with some embodiments of the present disclosure.

FIG. 8 is a data structure diagram of an example of the stream DB 310.

FIG. 9 is a data structure diagram showing an example of the user DB 312.

FIG. 10 is a data structure diagram showing an example of the gift DB 314.

DETAILED DESCRIPTION

One challenge in allocating the server capacity within a data accessing system is how to serve as many clients as possible with a limited number of servers. The data to be accessed may be live streaming data, such as live video data. The clients may be user terminals operated by users or viewers and requesting for the live streaming data. The clients may be user terminals operated by distributors or streamers and providing the live streaming data. The servers are where those live streaming data are ingested to be accessed by the clients.

Figure 1:
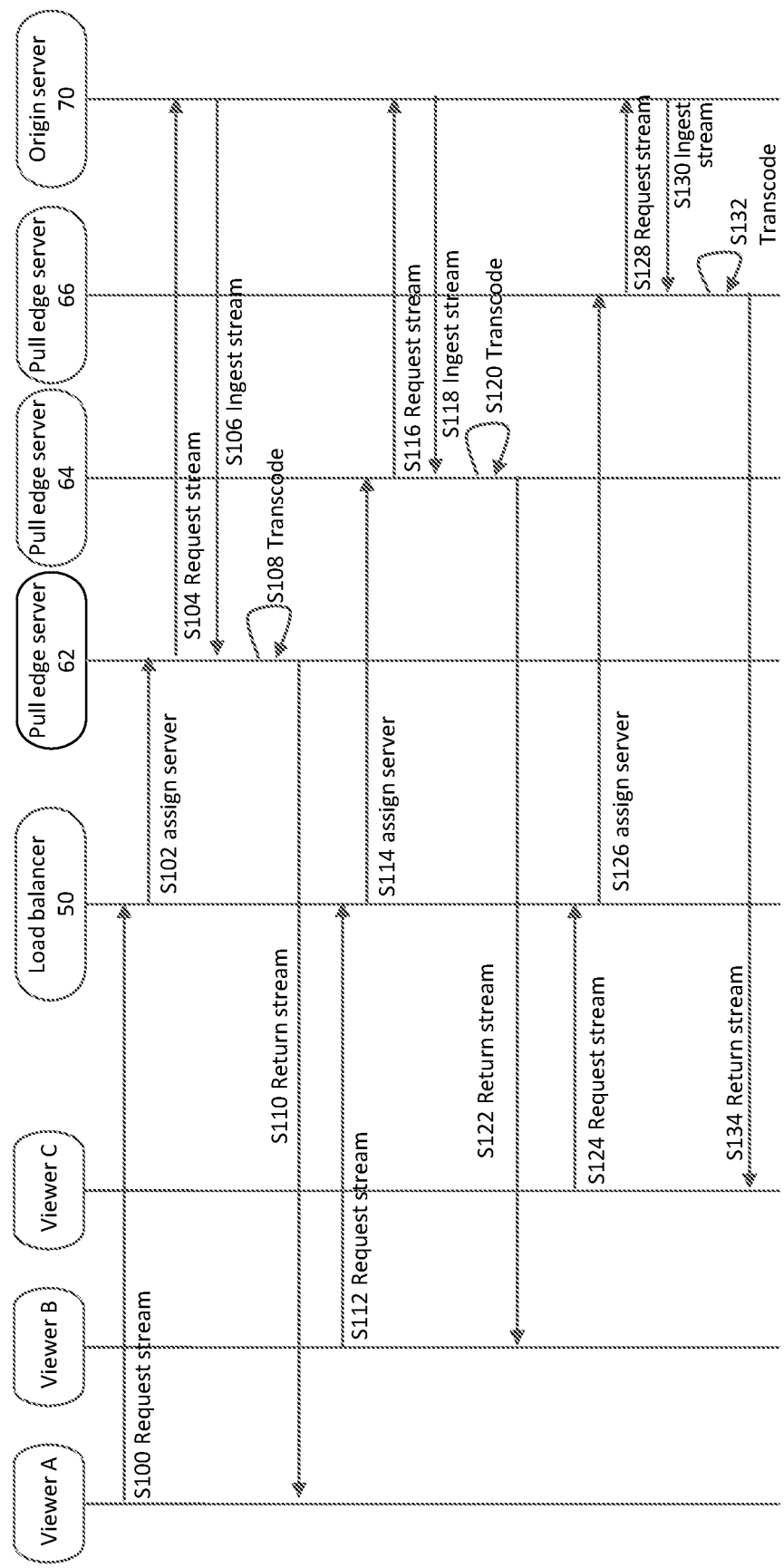
FIG. 1 shows an exemplary sequence chart illustrating a conventional operation of data accessing on the Internet.

FIG. 1 shows an exemplary sequence chart illustrating a conventional operation of data accessing on the Internet. Viewer A, viewer B and viewer C can be viewed as user terminals operated by viewers requesting for streaming data. A user terminal may be a smartphone, a laptop, a personal computer, or any device that can access the Internet. The load balancer 50 is configured to choose a pull edge server, and direct, pass, transmit, distribute or assign a request from a viewer to the pull edge server for accessing the streaming data.

In step S100, viewer A sends out a request for streaming data to the load balancer 50.

In step S102, the load balancer 50 chooses the pull edge server 62 and directs or transmits the request from viewer A to the pull edge server 62.

In step S104, the pull edge server 62 transmits the request to the origin server 70, in which the streaming data is stored or received.

In step S106, the streaming data is ingested from the origin server 70 to the pull edge server 62.

In step S108, the pull edge server 62 transcodes the streaming data. For example, audio data of the streaming data may be transcoded from AAC format to Opus format to support WebRTC accessing.

In step S110, the pull edge server 62 returns or transmits the transcoded streaming data to viewer A.

In step S112, viewer B sends out a request for streaming data to the load balancer 50.

In step S114, the load balancer 50 chooses the pull edge server 64 and directs or transmits the request from viewer B to the pull edge server 64.

In step S116, the pull edge server 64 transmits the request to the origin server 70, in which the streaming data is received and/or stored.

In step S118, the streaming data is ingested from the origin server 70 to the pull edge server 64.

In step S120, the pull edge server 64 transcodes the streaming data. For example, audio data of the streaming data may be transcoded from AAC format to Opus format to support WebRTC accessing for a viewer.

In step S122, the pull edge server 64 returns or transmits the transcoded streaming data to viewer B.

In step S124, viewer C sends out a request for streaming data to the load balancer 50.

In step S126, the load balancer 50 chooses the pull edge server 66 and directs or transmits the request from viewer C to the pull edge server 66.

In step S128, the pull edge server 66 transmits the request to the origin server 70, in which the streaming data is received and/or stored.

In step S130, the streaming data is ingested from the origin server 70 to the pull edge server 66.

In step S132, the pull edge server 66 transcodes the streaming data. For example, audio data of the streaming data may be transcoded from AAC format to Opus format to support WebRTC accessing.

In step S134, the pull edge server 64 returns or transmits the transcoded streaming data to viewer C.

Conventionally, a load balancer distributes, transmits or directs the requests for streaming data from viewers to pull edge servers in a fair or even manner to balance the loading of the pull edge servers. That is, a load balancer distributes a newly received request to "the most available" or "the least occupied" server, which may be a server with the lowest CPU usage rate, a server with the lowest memory usage rate, or a server with the fewest accessing clients.

Conventionally, the load balancer does not take the resource or identity of the requested streaming data into consideration when directing the request to a pull edge server. The resource or identity of the streaming data may be or may include, for example, the streamer or distributor providing the streaming data. Therefore, it often happens that requests for the same streaming data (streaming data from the same distributor) are directed to different pull edge servers for the accessing.

For example, in FIG. 1, when viewer A, viewer B and viewer C request for the same streaming data (that is, streaming data of the same resource or the same identity), the load balancer would still evenly direct/transmit their requests to pull edge servers 62, 64 and 66.

However, in this manner, the transcoding process of the same streaming data needs to be executed 3 times to complete the data accessing. That is, the transcoding process of the same streaming data needs to be executed in step S108, step S120 and step S132, at the pull edge server 62, the pull edge server 64 and the pull edge server 66, respectively.

This would cause a waste for the whole pull edge server resources, specifically in the CPU consumption. A transcoding process would consume a certain amount of CPU usage rate for the server wherein the transcoding process is executed. If the CPU usage rate needed for the transcoding process is X percent, the system in FIG. 1 would cause 3X CPU usage rate consumption for the whole pull edge server resource. Depending on the configuration of the pull edge server, X may range between 1 to 10. For example, X may be 2.

Serving each viewer or client, such as returning the streaming data to a viewer, also consumes the CPU usage rate of a pull edge server. Therefore, it is desirable to reduce the consumption of the pull edge server resource in streaming data ingestion and transcoding, such that the number of viewers to be served can be increased.

Figure 2:
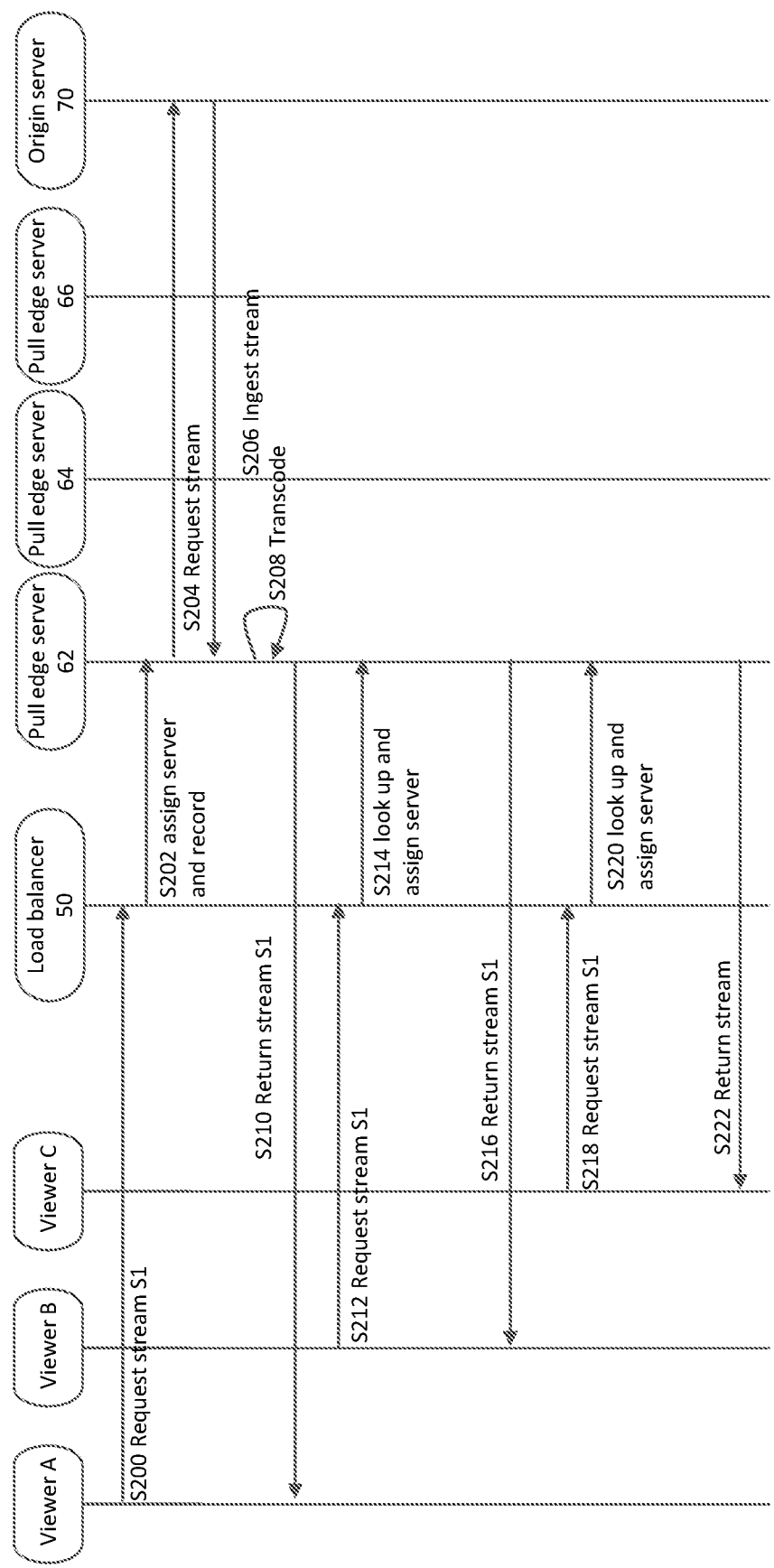
FIG. 2 shows an exemplary sequence chart illustrating an operation of data accessing on the Internet in accordance with some embodiments of the present disclosure.

FIG. 2 shows an exemplary sequence chart illustrating an operation of data accessing on the Internet in accordance with some embodiments of the present disclosure.

At first, the user terminal of viewer A receives a list of currently available live streams from a control server (described later) via network. The list includes a list of stream IDs each of which corresponds to a respective currently available live stream. The user terminal displays the received list on its display. Viewer A selects one live stream out of the list on the display. The user terminal then generates a distribution request for streaming data for the selected live stream. In step S200, the user terminal of viewer A sends out the generated distribution request for streaming data to the load balancer 50. The distribution request includes an identification information S1 of the streaming data for the selected live stream. In some embodiments, the identification information S1 corresponds to a resource of the streaming data, such as the distributor or the streamer providing the streaming data. The identification information S1 may be a streamer ID or distributor ID. In some embodiments, the identification information S1 corresponds to an identity of the streaming data. The identification information S1 may be the stream ID of the streaming data. In some embodiments, the identification information S1 is included in a URL included in the distribution request from viewer A. An identification information is used to indicate or to specify the streaming data being requested. In some embodiments, a live streaming data is uniquely specified by an identification information.

In step S202, the load balancer 50 chooses the pull edge server 62 and directs/transmits the distribution request from viewer A to the pull edge server 62. The load balancer 50 records the identification information S1 in the distribution request from viewer A to be corresponding to the pull edge server 62 in a lookup table or a cache table or a pull edge server table. In some embodiments, the lookup table or cache table or pull edge server table is implemented and managed in the load balancer 50.

In step S204, the pull edge server 62 transmits the distribution request from viewer A to the origin server 70, in which the streaming data is received and/or stored.

In step S206, the streaming data is ingested from the origin server 70 to the pull edge server 62.

In step S208, the pull edge server 62 transcodes the streaming data. For example, audio data of the streaming data may be transcoded from AAC format to Opus format to support WebRTC accessing for a viewer.

In step S210, the pull edge server 62 returns or transmits the transcoded streaming data to viewer A.

The user terminal of viewer B receives a list of currently available live streams from the control server via network. The user terminal displays the received list on its display. Viewer B selects the same live stream as the one selected by Viewer A. The user terminal then generates a distribution request for streaming data for the selected live stream. In step S212, the user terminal of viewer B sends out the generated distribution request for streaming data to the load balancer 50. The identification information included in the distribution request from viewer B is S1, same as the identification information included in the distribution request from viewer A in step S200, which indicates that the streaming data requested by viewer B is the same as the streaming data requested by viewer A.

In step S214, the load balancer 50 looks up the cache table to check if the identification information included in the distribution request from viewer B is already recorded in the cache table, and to search for the corresponding pull edge server if the identification information included in the distribution request from viewer B is already recorded in the cache table. Because the identification information included in the distribution request from viewer B is also S1, the load balancer 50 determines, by the cache table, the identification information included in the distribution request from viewer B to be the same as the identification information included in the distribution request from viewer A. The load balancer 50 determines that the identification information in the distribution request from viewer B exists in the cache table (recorded in step S202), and chooses the corresponding pull edge server recorded in the cache table, which is the pull edge server 62, to be the pull edge server for the streaming data accessing for viewer B. The load balancer 50 directs/transmits the distribution request from viewer B to the pull edge server 62.

In step S216, the pull edge server 62 returns or transmits the transcoded streaming data to viewer B. Since the ingestion process (into the pull edge server 62) of the streaming data corresponding to the identification information S1 has already been executed in step S206 during viewer A's accessing of the streaming data, there is no need for another ingestion process during viewer B's accessing of the same streaming data. Since the transcoding process of the streaming data corresponding to the identification information S1 has already been executed in step S208 during viewer A's accessing of the streaming data, there is no need for another transcoding process during viewer B's accessing of the streaming data.

The user terminal of viewer C receives a list of currently available live streams from a control server via network. The user terminal displays the received list on its display. Viewer C selects the same live stream as the one selected by Viewer A. The user terminal then generates a distribution request for streaming data for the selected live stream. In step S218, the user terminal of viewer C sends out the generated distribution request for streaming data to the load balancer 50. The identification information included in the distribution request from viewer C is S1, same as the identification information included in the distribution request from viewer A in step S200, which indicates that the streaming data requested by viewer C is the same as the streaming data requested by viewer A.

In step S220, the load balancer 50 looks up the cache table to check if the identification information included in the distribution request from viewer C is already recorded in the cache table, and to search for the corresponding pull edge server if the identification information included in the distribution request from viewer C is already recorded in the cache table. Because the identification information included in the distribution request from viewer C is also S1, the load balancer 50 determines, by the cache table, the identification information included in the distribution request from viewer C to be the same as the identification information included in the distribution request from viewer A. The load balancer 50 determines that the identification information in the distribution request from viewer C exists in the cache table (recorded in step S202), and chooses the corresponding pull edge server recorded in the cache table, which is the pull edge server 62, to be the pull edge server for the streaming data accessing for viewer C. The load balancer 50 directs/transmits the distribution request from viewer C to the pull edge server 62.

In step S222, the pull edge server 62 returns or transmits the transcoded streaming data to viewer C. Since the ingestion process (into the pull edge server 62) of the streaming data corresponding to the identification information S1 has already been executed in step S206 during viewer A's accessing of the streaming data, there is no need for another ingestion process during viewer C's accessing of the same streaming data. Since the transcoding process of the streaming data corresponding to the identification information S1 has already been executed in step S208 during viewer A's accessing of the streaming data, there is no need for another transcoding process during viewer C's accessing of the streaming data.

Conventionally, the load balancer 50 would have chosen the pull edge server 64 or the pull edge server 66 for the distribution request from viewer B or the distribution request from viewer C, because the pull edge server 64 or the pull edge server 66 has not yet been ingested with streaming data and has more CPU, memory or bandwidth resources than the pull edge server 62, which has already been ingested with streaming data during viewer A's accessing. However, in that case, the ingestion process and the transcoding process of the streaming data would be executed 3 times, which consumes much CPU, memory, time or bandwidth resources of the whole pull edge server pool. Furthermore, the resources consumed in the ingestion process or the transcoding process increases as the number of viewers accessing the same streaming data increases.

In the embodiment shown in FIG. 2, by utilizing a cache table (or pull edge server table) in the load balancer 50, all viewers requesting for the same streaming data are directed to the same pull edge server. Therefore, the ingestion process and the transcoding process of the streaming data would be executed only one time, which saves the CPU, memory, time or bandwidth resources of the whole pull edge server pool. Furthermore, the resources consumed in the ingestion process or the transcoding process do not increase as the number of viewers accessing the same streaming data increases. Therefore, the saved resources in the pull edge server pool can be used to serve more viewers. Transcoding, or real time transcoding, is crucial for any streaming data accessing where the format of the streaming data received and/or stored in the origin server is different from the format of the streaming data being transmitted to the clients. In some embodiments, transcoding audio data included in streaming data may consume more CPU resources than transcoding video data included in the same streaming data.

By utilizing the cache table in the load balancer, the present disclosure also provides the function of real time dynamic scaling for the viewers accessing streaming data. That is, as the number of viewers increases in real time, a later viewer requesting for streaming data can be directed to the correct pull edge server while the streaming data is already being accessed by a former viewer through the pull edge server.

In some embodiments of the present disclosure, the data being cached in the cache table is a route or an access, instead of the streaming data itself. For example, the route may refer to a pull edge server wherein the requested streaming data is being ingested.

In some embodiments, a load balancer may include or may be part of a reverse proxy, such as the Traefik. In some embodiments, a cache table implemented in the load balancer can be referred to as a URL cache table, because the identification information of streaming data is included in a URL during transmission. The present disclosure realizes a URL affinity function by implementing the cache table in the load balancer for live streaming data accessing.

Conventional Traefik does not have a cache table. Conventional load balancing based on cookie affinity assigns the pull edge server according to the viewer IDs, wherein requests from the same viewer would be assigned to the same pull edge server, which would result in resource waste for the pull edge server pool.

Figure 3:
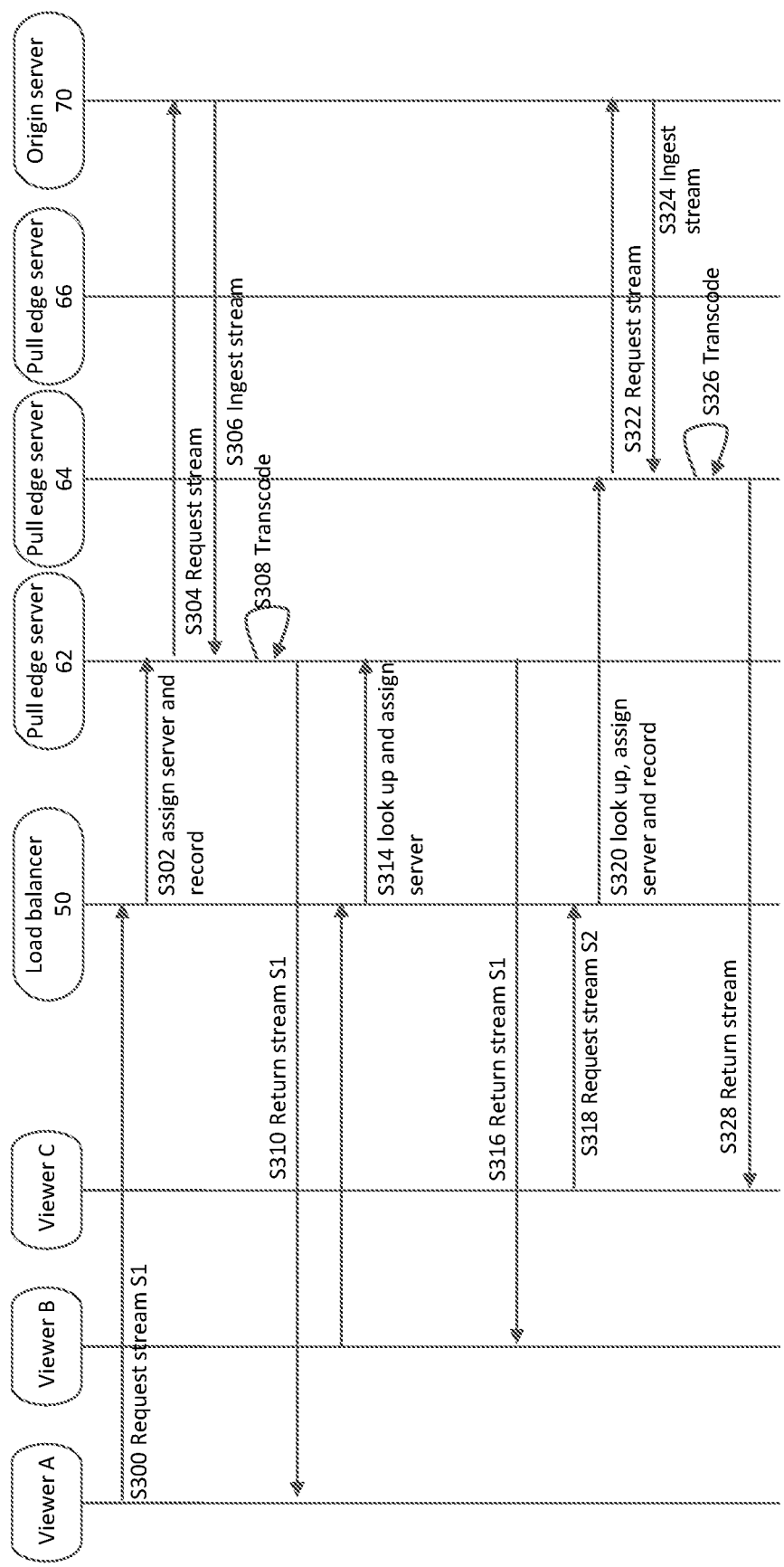
FIG. 3 shows an exemplary sequence chart illustrating an operation of data accessing on the Internet in accordance with some embodiments of the present disclosure.

FIG. 3 shows an exemplary sequence chart illustrating an operation of data accessing on the Internet in accordance with some embodiments of the present disclosure.

In step S300, viewer A sends out a distribution request for streaming data to the load balancer 50. The distribution request includes an identification information S1 of the streaming data. In some embodiments, the identification information S1 corresponds to an identity of the streaming data. The identification information S1 may be the stream ID of the streaming data. In some embodiments, the identification information S1 is included in a URL included in the distribution request from viewer A. An identification information is used to indicate or to specify the streaming data being requested. In some embodiments, a live streaming data is uniquely specified by an identification information.

In step S302, the load balancer 50 chooses the pull edge server 62 and directs/transmits the distribution request from viewer A to the pull edge server 62. The load balancer 50 records the identification information S1 in the distribution request from viewer A to be corresponding to the pull edge server 62 in a lookup table or a cache table. In some embodiments, the lookup table or cache table is implemented and managed in the load balancer 50.

In step S304, the pull edge server 62 transmits the distribution request from viewer A to the origin server 70, in which the streaming data is received and/or stored. In some embodiments, the origin server 70 is configured to receive the streaming data from a device of a streamer providing the streaming data identified by the identification information S1 (which could be a stream ID).

In step S306, the streaming data is ingested from the origin server 70 to the pull edge server 62.

In step S308, the pull edge server 62 transcodes the streaming data. For example, audio data of the streaming data may be transcoded from AAC format to Opus format to support WebRTC accessing for a viewer.

In step S310, the pull edge server 62 returns or transmits the transcoded streaming data to viewer A.

In step S312, viewer B sends out a distribution request for streaming data to the load balancer 50. The identification information included in the distribution request from viewer B is S1, same as the identification information included in the distribution request from viewer A in step S200, which indicates that the streaming data requested by viewer B is the same as the streaming data requested by viewer A.

In step S314, the load balancer 50 looks up the cache table to check if the identification information included in the distribution request from viewer B is already recorded in the cache table, and to search for the corresponding pull edge server if the identification information included in the distribution request from viewer B is already recorded in the cache table. Because the identification information included in the distribution request from viewer B is also S1, the load balancer 50 determines, by the cache table, the identification information included in the distribution request from viewer B to be the same as the identification information included in the distribution request from viewer A. The load balancer 50 determines that the identification information in the distribution request from viewer B exists in the cache table (recorded in step S202), and chooses the corresponding pull edge server recorded in the cache table, which is the pull edge server 62, to be the pull edge server for the streaming data accessing for viewer B. The load balancer 50 directs/transmits the distribution request from viewer B to the pull edge server 62.

In step S316, the pull edge server 62 returns or transmits the transcoded streaming data to viewer B. Since the ingestion process (into the pull edge server 62) of the streaming data corresponding to the identification information S1 has already been executed in step S206 during viewer A's accessing of the streaming data, there is no need for another ingestion process during viewer B's accessing of the same streaming data. Since the transcoding process of the streaming data corresponding to the identification information S1 has already been executed in step S208 during viewer A's accessing of the streaming data, there is no need for another transcoding process during viewer B's accessing of the streaming data.

In step S318, viewer C sends out a distribution request for streaming data to the load balancer 50. The identification information included in the distribution request from viewer C is S2, different from the identification information S1 included in the distribution request from viewer A in step S300, which indicates that the streaming data requested by viewer C is different from the streaming data requested by viewer A.

In step S320, the load balancer 50 looks up the cache table to check if the identification information included in the distribution request from viewer C is already recorded in the cache table. Because the identification information S2 included in the distribution request from viewer C has never been recorded in the cache table, the load balancer 50 determines the identification information in the distribution request from viewer C to be nonexistent in the cache table. Therefore, the load balancer 50 chooses the pull edge server 64, which has more available resources (such as CPU, memory or bandwidth resources) than the pull edge server 62, to be the pull edge server for the streaming data accessing for viewer C. The load balancer 50 directs/transmits the distribution request from viewer C to the pull edge server 64. The load balancer 50 records the identification information S2 in the distribution request from viewer C to be corresponding to the pull edge server 64 in the cache table.

In step S322, the pull edge server 64 transmits the distribution request from viewer C to the origin server 70, in which the streaming data corresponding to the identification information S2 is received and/or stored.

In step S324, the streaming data corresponding to the identification information S2 is ingested from the origin server 70 to the pull edge server 64.

In step S326, the pull edge server 62 transcodes the streaming data. For example, audio data of the streaming data may be transcoded from AAC format to Opus format to support WebRTC accessing for a viewer.

In step S328, the pull edge server 64 returns or transmits the transcoded streaming data to viewer A.

In some embodiments, transcoding process for one streaming data may consume 1% to 10% of CPU usage rate (for example, 2%) for a pull edge server. In some embodiments, serving each viewer with the requested streaming data may consume 0.05% to 1% of CPU usage rate (for example, 0.1%) for a pull edge server.

In some embodiments, the load balancer may try to distribute a request from a viewer according to the cache table first, as described above. If the identification information included in the request cannot be found in the cache table, the load balancer may switch to the even distribution mode, and may distribute the request to the pull edge server with the most available resources.

FIG. 4 shows an exemplary data structure of the pull edge server table in accordance with some embodiments of the present disclosure. The pull edge server table stores information on the pull edge servers. In particular, the pull edge server table includes (or is, in some embodiments) the cache table that stores a stream ID which identifies a currently available live stream in a live streaming platform and a respective server ID which identifies the pull edge server handling said currently available live stream. The pull edge server table stores a server ID which identifies a pull edge server, stream ID(s) which identify currently available live stream(s) being handled by the respective pull edge server, CPU usage rate of the respective pull edge server, memory usage rate of the respective pull edge server and the number of connections of the pull edge server. The number of connections represents the number of channels or connections established in between the pull edge server and the user terminals. The number of connections of a pull edge server may be the same as the number of the user terminals which are connected to the pull edge server.

In this embodiment, the identification information is the stream ID, which uniquely identifies a live stream (or streaming data). For example, the pull edge server 62, which is identified by the server ID "SV1", is the pull edge server corresponding to the streaming data of the live stream identified by the stream ID "S1", and the pull edge server 64, which is identified by the server ID "SV2", is the pull edge server corresponding to the streaming data of the live stream identified by the stream ID "S5". In some embodiments, two distribution requests (requests for streaming data) will carry the same stream ID when requesting the same streaming data.

The pull edge server table (or cache table) is utilized by the load balancer 50 (or a processing unit of the load balancer 50) to store/record the identification information included in a distribution request for streaming data. The pull edge server table (or cache table) is utilized by the load balancer 50 (or a processing unit of the load balancer 50) to search for the identification information of a new distribution request and the corresponding pull edge server.

In some embodiments, the cache table allocation method described above can be utilized to dynamically maximize the viewers to be served with a limited number of pull edge servers. Parameters such as the number of pull edge servers, the number of viewers or the expected number of viewers, the number of different streaming data being accessed, the resource cost for streaming data ingestion on each pull edge server, and the resource cost for transcoding streaming data on each pull edge server would be taken into consideration in the dynamic maximizing process. For example, according to the above parameters, an optimal viewer to streamer (or identification information) ratio for each pull edge server can be determined to maximize the number of total viewers in the system.

In some embodiments, a user terminal can be viewed as a system comprising one or a plurality of processors, wherein the one or plurality of processors execute a machine-readable instruction to perform processes, such as the data accessing processes described above.

In some embodiments, an origin server, and/or a load balancer belong to a system providing a streaming service. In some embodiments, the streaming service can be accessed by an application operating on a user terminal such as a smartphone or a tablet.

Figure 5:
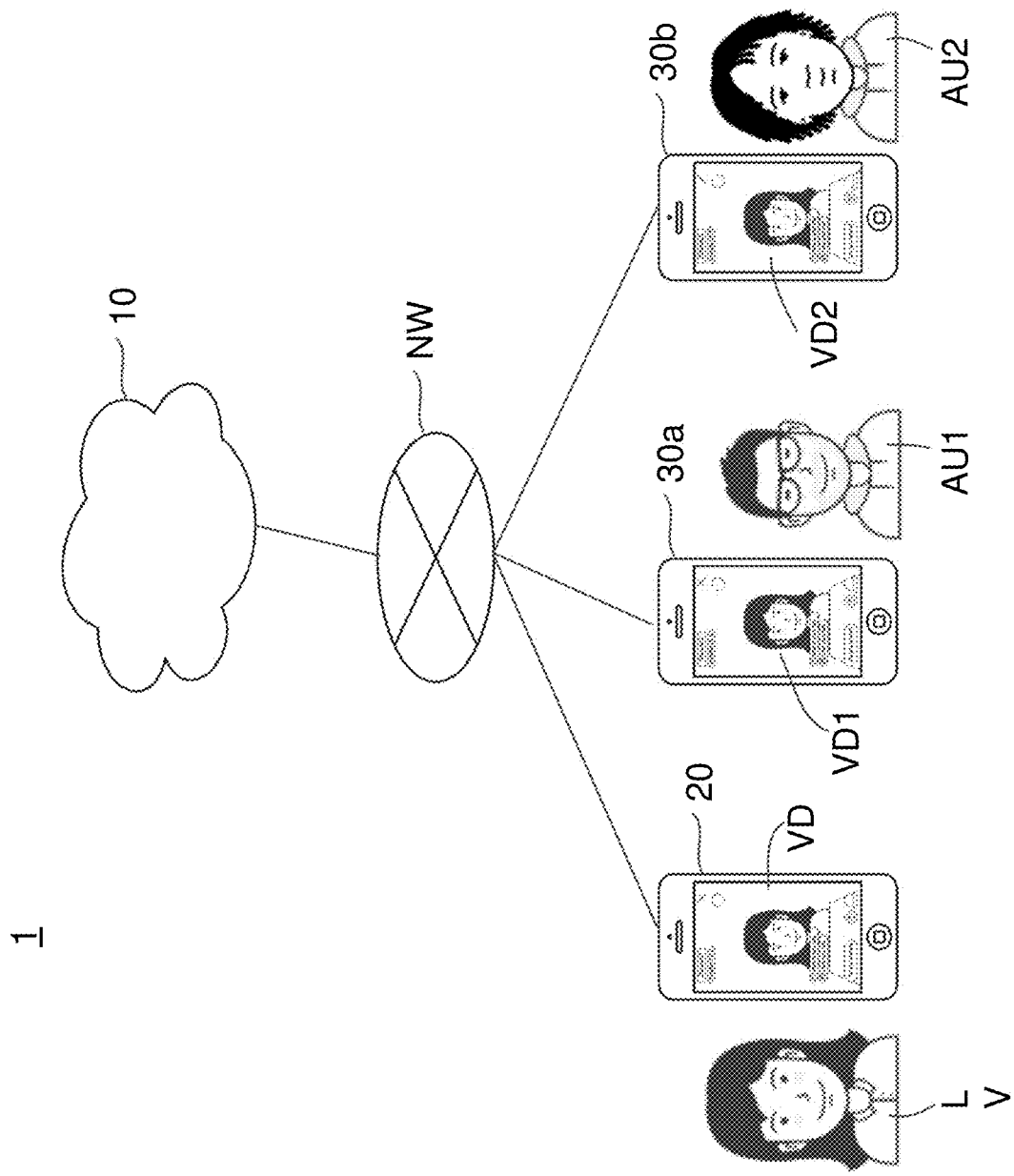
FIG. 5 shows a schematic configuration of a live streaming system 1 according to some embodiments of the present disclosure.

FIG. 5 shows a schematic configuration of a live streaming system 1 according to some embodiments of the present disclosure. The live streaming system 1 provides a live streaming service for the streaming streamer (could be referred to as liver, anchor, or distributor) LV and viewer (could be referred to as audience) AU (AU1, AU2 . . . ) to interact or communicate in real time. As shown in FIG. 1, the live streaming system 1 includes a server system 10, a user terminal 20 and user terminals 30 (30a, 30b . . . ). In some embodiments, the streamers and viewers may be collectively referred to as users. The server system 10 may include one or a plurality of information processing devices connected to a network NW. The user terminal 20 and 30 may be, for example, mobile terminal devices such as smartphones, tablets, laptop PCs, recorders, portable gaming devices, and wearable devices, or may be stationary devices such as desktop PCs. The server system 10, the user terminal 20 and the user terminal 30 are interconnected so as to be able to communicate with each other over the various wired or wireless networks NW.

The live streaming system 1 involves the distributor LV, the viewers AU, and an administrator (or an APP provider, not shown) who manages the server system 10. The distributor LV is a person who broadcasts contents in real time by recording the contents with his/her user terminal 20 and uploading them directly to the server system 10. Examples of the contents may include the distributor's own songs, talks, performances, gameplays, and any other contents. The administrator provides a platform for live-streaming contents on the server system 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or send gifts via the user terminal 30. The distributor LV who is delivering the content may respond to such comments, cheers, or gifts. The response is transmitted to the viewer AU via video and/or audio, thereby establishing an interactive communication.

The term "live-streaming" may mean a mode of data transmission that allows a content recorded at the user terminal 20 of the distributor LV to be played or viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay even with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 or 30, and audio data generated using an audio input function of the user terminals 20 or 30. Video data is reproduced in the user terminals 20 and 30, so that the users can view contents. In some embodiments, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server system 10, the video data generated at the distributor's user terminal, the video data that passes through the server system 10, and the video data received and reproduced at the viewer's user terminal are all the same video data.

In the example in FIG. 5, the distributor LV provides the live streaming data. The user terminal 20 of the distributor LV generates the streaming data by recording images and sounds of the distributor LV, and the generated data is transmitted to the server system 10 over the network NW. At the same time, the user terminal 20 displays a recorded video image VD of the distributor LV on the display of the user terminal 20 to allow the distributor LV to check the live streaming contents currently performed.

The user terminals 30a and 30b of the viewers AU1 and AU2 respectively, who have requested the platform to view the live streaming of the distributor LV, receive video data related to the live streaming (may also be herein referred to as "live-streaming video data") over the network NW and reproduce the received video data to display video images VD1 and VD2 on the displays and output audio through the speakers. The video images VD1 and VD2 displayed at the user terminals 30a and 30b, respectively, are substantially the same as the video image VD captured by the user terminal 20 of the distributor LV, and the audio outputted at the user terminals 30a and 30b is substantially the same as the audio recorded by the user terminal 20 of the distributor LV.

Recording of the images and sounds at the user terminal 20 of the distributor LV and reproduction of the video data at the user terminals 30a and 30b of the viewers AU1 and AU2 are performed substantially simultaneously. Once the viewer AU1 types a comment about the contents provided by the distributor LV on the user terminal 30*a*, the server system 10 displays the comment on the user terminal 20 of the distributor LV in real time and also displays the comment on the user terminals 30*a* and 30*b* of the viewers AU1 and AU2, respectively. When the distributor LV reads the comment and develops his/her talk to cover and respond to the comment, the video and sound of the talk are displayed on the user terminals 30*a* and 30*b* of the viewers AU1 and AU2, respectively. This interactive action is recognized as the establishment of a conversation between the distributor LV and the viewer AU1. In this way, the live streaming system 1 realizes the live streaming that enables interactive communication, not one-way communication.

Figure 6:
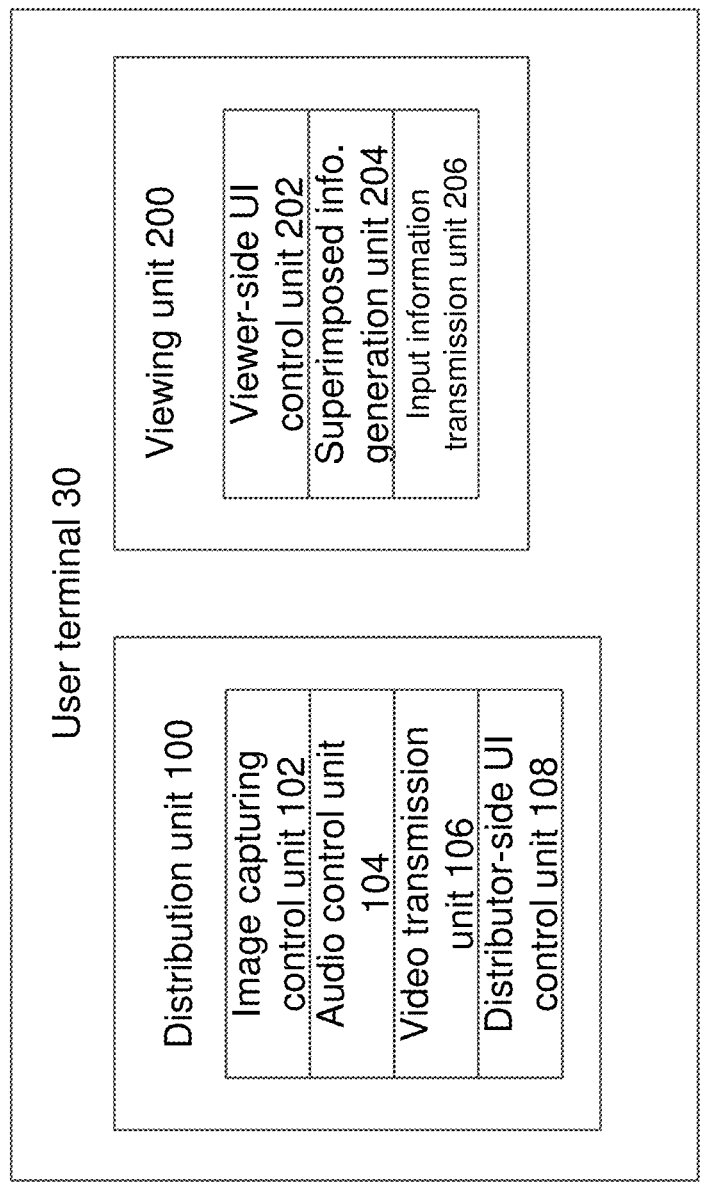
FIG. 6 is a block diagram showing functions and configuration of the user terminal 30 of FIG. 5 according to some embodiments of the present disclosure.

FIG. 6 is a block diagram showing functions and configuration of the user terminal 30 of FIG. 5 according to some embodiments of the present disclosure. The user terminal 20 has the same or similar functions and configuration as the user terminal 30. Each block in FIG. 6 and the subsequent block diagrams may be realized by elements such as a computer CPU or a mechanical device in terms of hardware, and can be realized by a computer program or the like in terms of software. Functional blocks could be realized by cooperative operation between these elements. Therefore, it is understood by those skilled in the art that these functional blocks can be realized in various forms by combining hardware and software.

The distributor LV and the viewers AU may download and install a live streaming application program (hereinafter referred to as a live streaming application) to the user terminals 20 and 30 from a download site over the network NW. Alternatively, the live streaming application may be pre-installed on the user terminals 20 and 30. When the live streaming application is executed on the user terminals 20 and 30, the user terminals 20 and 30 communicate with the server system 10 over the network NW to implement or execute various functions. Hereinafter, the functions implemented by the user terminals 20 and 30 (processors such as CPUs) in which the live streaming application is run will be described as functions of the user terminals 20 and 30. These functions are realized in practice by the live streaming application on the user terminals 20 and 30. In some embodiments, these functions may be realized by a computer program that is written in a programming language such as HTML (HyperText Markup Language), transmitted from the server system 10 to web browsers of the user terminals 20 and 30 over the network NW, and executed by the web browsers.

The user terminal 30 includes a distribution unit 100 and a viewing unit 200. The distribution unit 100 generates video data in which the user's image and sound are recorded, and provides the video data to the server system 10. The viewing unit 200 receives video data from the server system 10 to reproduce the video data. The user activates the distribution unit 100 when the user performs live streaming, and activates the viewing unit 200 when the user views a video. The user terminal in which the distribution unit 100 is activated is the distributor's terminal, i.e., the user terminal that generates the video data. The user terminal in which the viewing unit 200 is activated is the viewer's terminal, i.e., the user terminal in which the video data is reproduced and played.

The distribution unit 100 includes an image capturing control unit 102, an audio control unit 104, a video transmission unit 106, and a distribution-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server system 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distribution-side UI control unit 108 controls a UI (user interface) for the distributor. The distribution-side UI control unit 108 is connected to a display (not shown), and displays a video on the display by reproducing the video data that is to be transmitted by the video transmission unit 106. The distribution-side UI control unit 108 may display an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewing unit 200 receives, from the server system 10 over the network NW, video data related to the live streaming in which the distributor, the viewer who is the user of the user terminal 30, and other viewers participate. The viewer-side UI control unit 202 controls the UI for the viewers. The viewer-side UI control unit 202 is connected to a display and a speaker (not shown), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown) such as touch panels, keyboards, and displays, and obtains user input via these input means. The superimposed information generation unit 204 superimposes a predetermined frame image on an image generated from the video data from the server system 10. The frame image includes various user interface objects (hereinafter simply referred to as "objects") for accepting inputs from the user, comments entered by the viewers, and/or information obtained from the server system 10. The input information transmission unit 206 transmits the user input obtained by the viewer-side UI control unit 202 to the server system 10 over the network NW.

Figure 11:
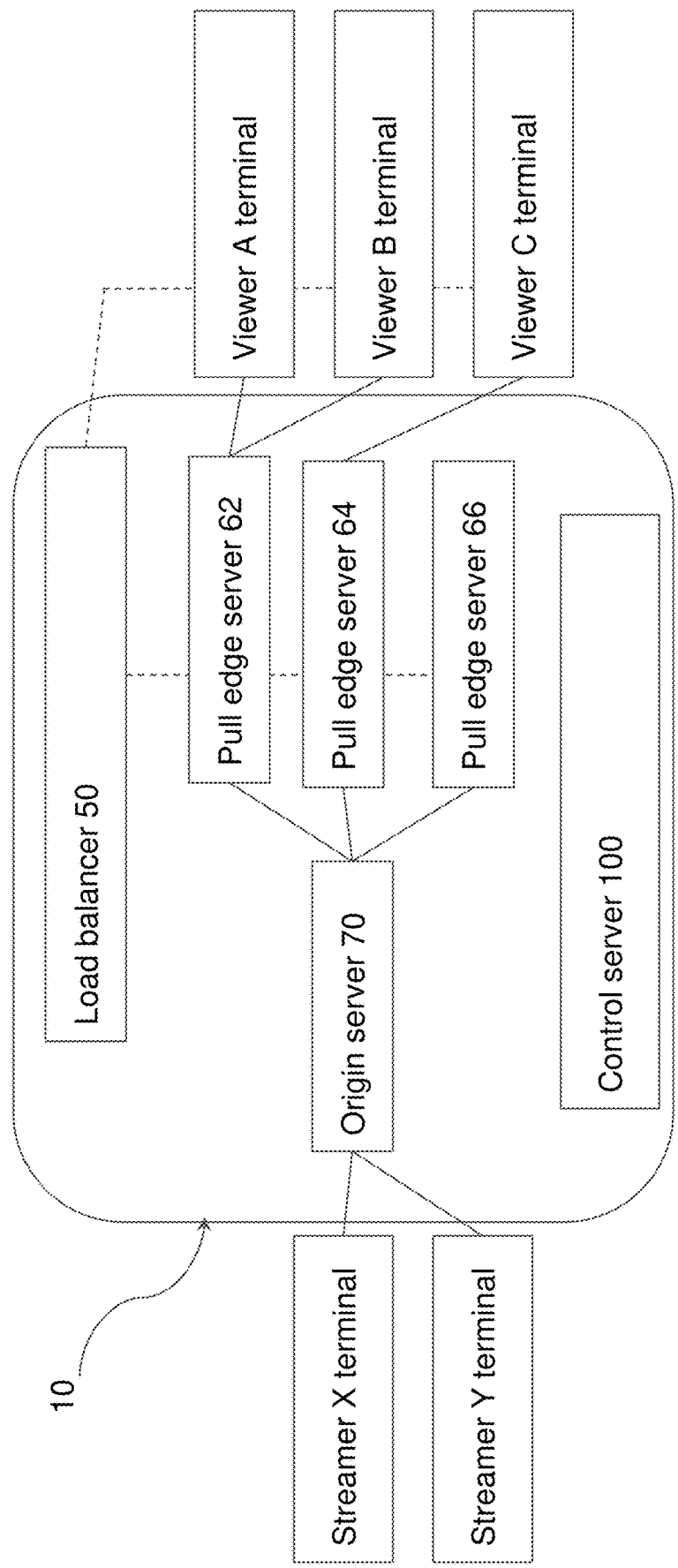
FIG. 11 is a block diagram showing functions and configuration of the server system 10 of FIG. 5 according to some embodiments of the present disclosure.

FIG. 11 is a block diagram showing functions and configuration of the server system 10 of FIG. 5 according to some embodiments of the present disclosure. The server system 10 includes an origin server 70, three pull edge servers 62, 64, 66, a load balancer 50 and a control server 100. The configuration and the number of servers shown in FIG. 11 are just for the purpose of illustration and the present disclosure is not limited to the configuration. The origin server 70 is connected to a plurality of streamers' user terminals which are currently generating live streaming data for live streams performed by the streamers. The origin server 70 receives, via network NW and from the streamer's user terminal, live streaming data for the live stream. The origin server 70 is connected to the three pull edge servers 62, 64, 68 within the server system 10. The load balancer 50 is connected to and controls the three pull edge servers 62,

64, 66. The load balancer 50 is connected to a plurality of viewers' user terminals via the network NW and receives a distribution request from the viewer's user terminal. The load balancer 50 controls or manages the connections established in between the pull edge servers 62, 64, 66 and the viewers' user terminals. The pull edge servers 62, 64, 66 may be connected to the viewers' user terminals via the network NW.

The origin server 70 and the pull edge servers 62, 64, 66 collectively relay the video data from the streamer's user terminal to the viewer's user terminal in a live streaming. Similar to the embodiments in FIG. 2 or FIG. 3, a distribution request (including the stream ID) is transmitted from the viewer's user terminal to the load balancer 50. The load balancer 50 then assigns or specifies one pull edge server to be the pull edge server wherein the live stream (specified by the stream ID) is ingested from the origin server 70. Specifically, the load balancer 50 transmits the distribution request to the pull edge server. The pull edge server requests the live streaming data from the origin server 70. The pull edge server then provides the live streaming data to the requesting viewer's user terminal. FIG. 11 shows exemplary connections corresponding to FIG. 3. The viewer A terminal and the viewer B terminal receive live streaming data for streamer X's live streaming through the origin server 70 and the pull edge server 62. The viewer C terminal receives live streaming data for streamer Y's live streaming through the origin server 70 and the pull edge server 64.

Figure 7:
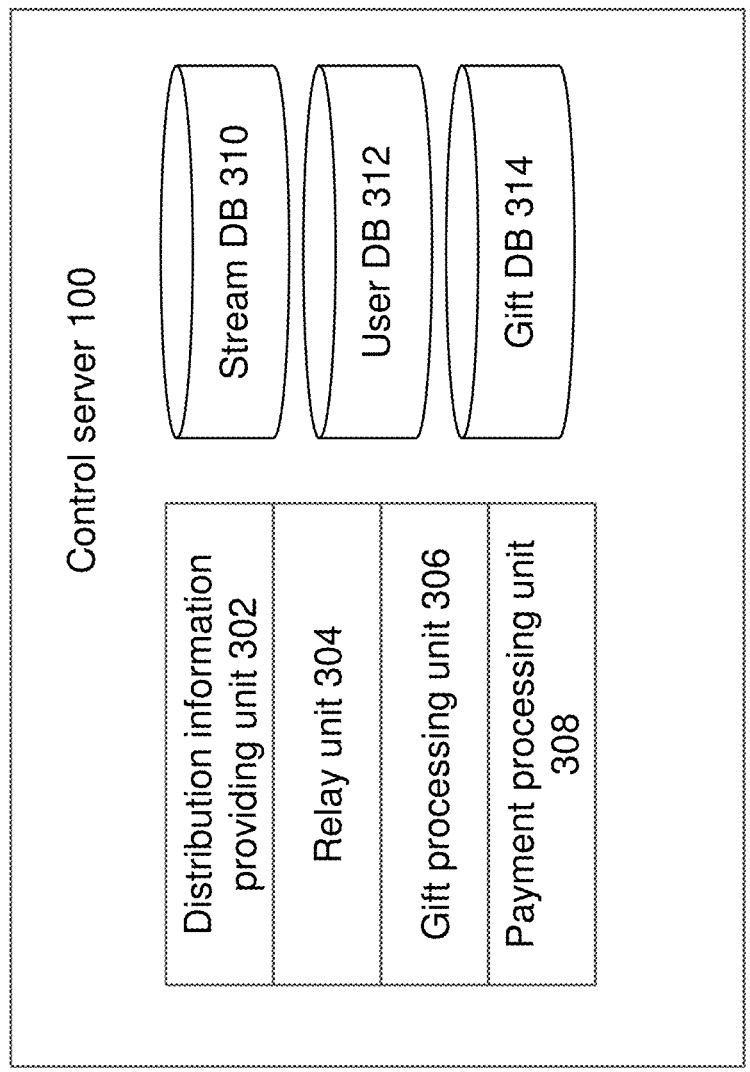
FIG. 7 shows a block diagram illustrating functions and configuration of the control server 100 of FIG. 11 according to some embodiments of the present disclosure.

FIG. 7 shows a block diagram illustrating functions and configuration of the control server 100 of FIG. 11 according to some embodiments of the present disclosure. The control server 100 includes a distribution information providing unit 302, a relay unit 304, a gift processing unit 306, a payment processing unit 308, a stream DB 310, a user DB 312 and a gift DB 314.

Upon reception of a notification or a request from the user terminal 20 on the distributor side to start a live streaming (or live streaming program) over the network NW, the distribution information providing unit 302 registers a stream ID for identifying this live streaming and the distributor ID of the distributor who performs the live streaming in the stream DB 310.

When the distribution information providing unit 302 receives a request to provide information about live streams from the viewing unit 200 of the user terminal 30 on the viewer side over the network NW, the distribution information providing unit 302 retrieves or checks currently available live streams from the stream DB 310 and makes a list of the available live streams. The distribution information providing unit 302 transmits the generated list to the requesting user terminal 30 over the network NW. The viewer-side UI control unit 202 of the requesting user terminal 30 generates a live stream selection screen based on the received list and displays it on the display of the user terminal 30. In some embodiments, a user terminal 30 receives identification information (such as a stream ID) of available live streams from the list generated by the distribution information providing unit 302.

Once the input information transmission unit 206 of the user terminal 30 receives the viewer's selection result on the live stream selection screen, the input information transmission unit 206 generates a distribution request including the stream ID of the selected live stream, and transmits the distribution request to the load balancer 50 in the server system 10 over the network NW. The load balancer 50 assigns a pull edge server to the requesting user terminal 30. The assigned pull edge server starts providing, to the requesting user terminal 30, the live stream specified by the stream ID included in the received distribution request. The distribution information providing unit 302 updates the stream DB 310 to include the user ID of the viewer of the requesting user terminal 30 into the viewer IDs of (or corresponding to) the stream ID.

The relay unit 304 receives from the input information transmission unit 206 a signal that represents user input by a viewer during the live streaming or reproduction of the video data. The signal that represents user input may be an object specifying signal for specifying an object displayed on the display of the user terminal 30, and the object specifying signal includes the viewer ID of the viewer, the distributor ID of the distributor of the live stream that the viewer watches, and an object ID that identifies the object. When the object is a gift, the object ID is the gift ID. Similarly, the relay unit 304 receives, from the distribution unit 100 of the user terminal 20, a signal that represents user input performed by the distributor during reproduction of the video data, such as the object specifying signal.

In some embodiments, the signal that represents user input may be a comment input signal including a comment entered by a viewer into the user terminal 30 and the viewer ID of the viewer. Upon reception of the comment input signal, the relay unit 304 transmits the comment and the viewer ID included in the signal to the user terminal 20 of the distributor and the user terminals 30 of other viewers. In these user terminals 20 and 30, the viewer-side UI control unit 202 and the superimposed information generation unit 204 display the received comment on the display in association with the viewer ID also received.

The gift processing unit 306 updates the user DB 312 so as to increase the points of the distributor depending on the points of the gift identified by the gift ID included in the object specifying signal. Specifically, the gift processing unit 306 refers to the gift DB 314 to specify the points to be granted for the gift ID included in the received object specifying signal. The gift processing unit 306 then updates the user DB 312 to add the determined points to the points of (or corresponding to) the distributor ID included in the object specifying signal.

The payment processing unit 308 processes payment of a price of a gift from a viewer in response to reception of the object specifying signal. Specifically, the payment processing unit 308 refers to the gift DB 314 to specify the price points of the gift identified by the gift ID included in the object specifying signal. The payment processing unit 308 then updates the user DB 312 to subtract the specified price points from the points of the viewer identified by the viewer ID included in the object specifying signal.

FIG. 8 is a data structure diagram of an example of the stream DB 310. The stream DB 310 holds information regarding a live stream (or a live streaming program) currently taking place. The stream DB 310 stores the stream ID, the distributor ID and the viewer ID, in association with each other. The stream ID is for identifying a live stream on a live streaming platform provided by the live streaming system 1. The distributor ID is a user ID for identifying the distributor who provides the live stream. The viewer ID is a user ID for identifying a viewer of the live stream. In the live streaming platform provided by the live streaming system 1 of some embodiments, when a user starts a live stream, the user becomes a distributor, and when the same user views a live stream broadcast by another user, the user also becomes a viewer. Therefore, the distinction between a distributor and a viewer is not fixed, and a user ID registered as a distributor ID at one time may be registered as a viewer ID at another time.

FIG. 9 is a data structure diagram showing an example of the user DB 312. The user DB 312 holds information regarding users. The user DB 312 stores the user ID and the point, in association with each other. Or, the user DB 312 stores pairs of user ID and points corresponding to each other. The user ID identifies a user. The point corresponds to the points the corresponding user has. The point is the electronic value circulated within the live streaming platform. In some embodiments, when a distributor receives a gift from a viewer during a live stream, the distributor's points increase by the value corresponding to the gift. The points are used, for example, to determine the amount of reward (such as money) the distributor receives from the administrator of the live streaming platform. Alternatively, when the distributor receives a gift from a viewer, the distributor may be given the amount of money corresponding to the gift instead of the points.

FIG. 10 is a data structure diagram showing an example of the gift DB 314. The gift DB 314 holds information regarding gifts available for the viewers in the live streaming. A gift is electronic data. A gift may be purchased with the points or money, or can be given for free. A gift may be given by a viewer to a distributor. Giving a gift to a distributor is also referred to as using, sending, or throwing the gift. Some gifts may be purchased and used at the same time, and some gifts may be purchased and then used at any time later by the purchaser viewer. When a viewer gives a gift to a distributor, the distributor is awarded the amount of points corresponding to the gift. When a gift is used, the use may trigger an effect associated with the gift. For example, an effect (such as visual or sound effect) corresponding to the gift will appear on the live streaming screen.

The gift DB 314 stores the gift ID, the awarded points, and the price points, in association with each other. The gift ID is for identifying a gift. The awarded points are the amount of points awarded to a distributor when the gift is given to the distributor. The price points are the amount of points to be paid for use (or purchase) of the gift. A viewer is able to give a desired gift to a distributor by paying the price points of the desired gift when the viewer is viewing the live stream. The payment of the price points may be made by an appropriate electronic payment means. For example, the payment may be made by the viewer paying the price points to the administrator. Alternatively, bank transfers or credit card payments may be used. The administrator is able to desirably set the relationship between the awarded points and the price points. For example, it may be set as the awarded points=the price points. Alternatively, points obtained by multiplying the awarded points by a predetermined coefficient such as 1.2 may be set as the price points, or points obtained by adding predetermined fee points to the awarded points may be set as the price points.

Figure 12:
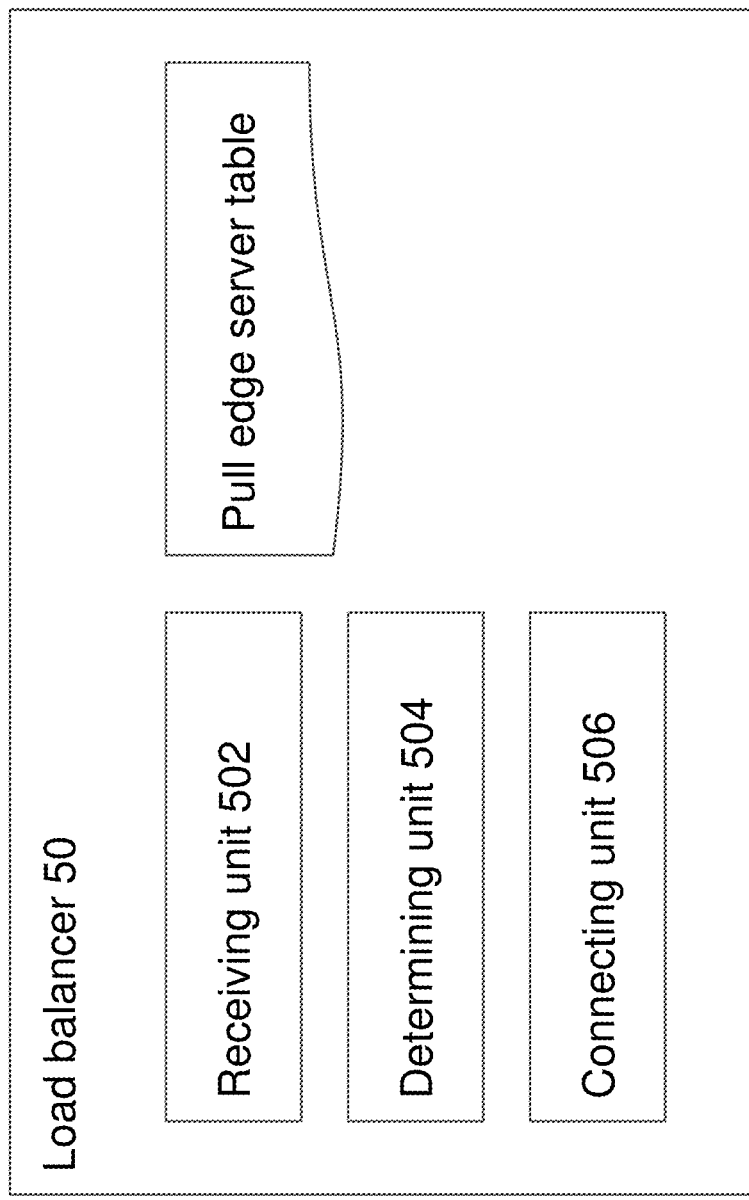
FIG. 12 shows a block diagram illustrating functions and configuration of the load balancer 50 of FIG. 11 according to some embodiments of the present disclosure.

FIG. 12 shows a block diagram illustrating functions and configuration of the load balancer 50 of FIG. 11 according to some embodiments of the present disclosure. The load balancer 50 includes a receiving unit 502, a determining unit 504, a connecting unit 506 and the pull edge server table. The receiving unit 502 is configured to receive, from the viewer's user terminal and via the network NW, the distribution request including the stream ID of the live stream selected by the viewer. The determining unit is configured to determine, in response to receiving the distribution request and by referring to the pull edge server table, the pull edge server handling the live stream which is identified by the stream ID included in the received distribution request. The connecting unit is configured to cause the determined pull edge server to send live streaming data for the live stream to the requesting viewer's user terminal.

Figure 13:
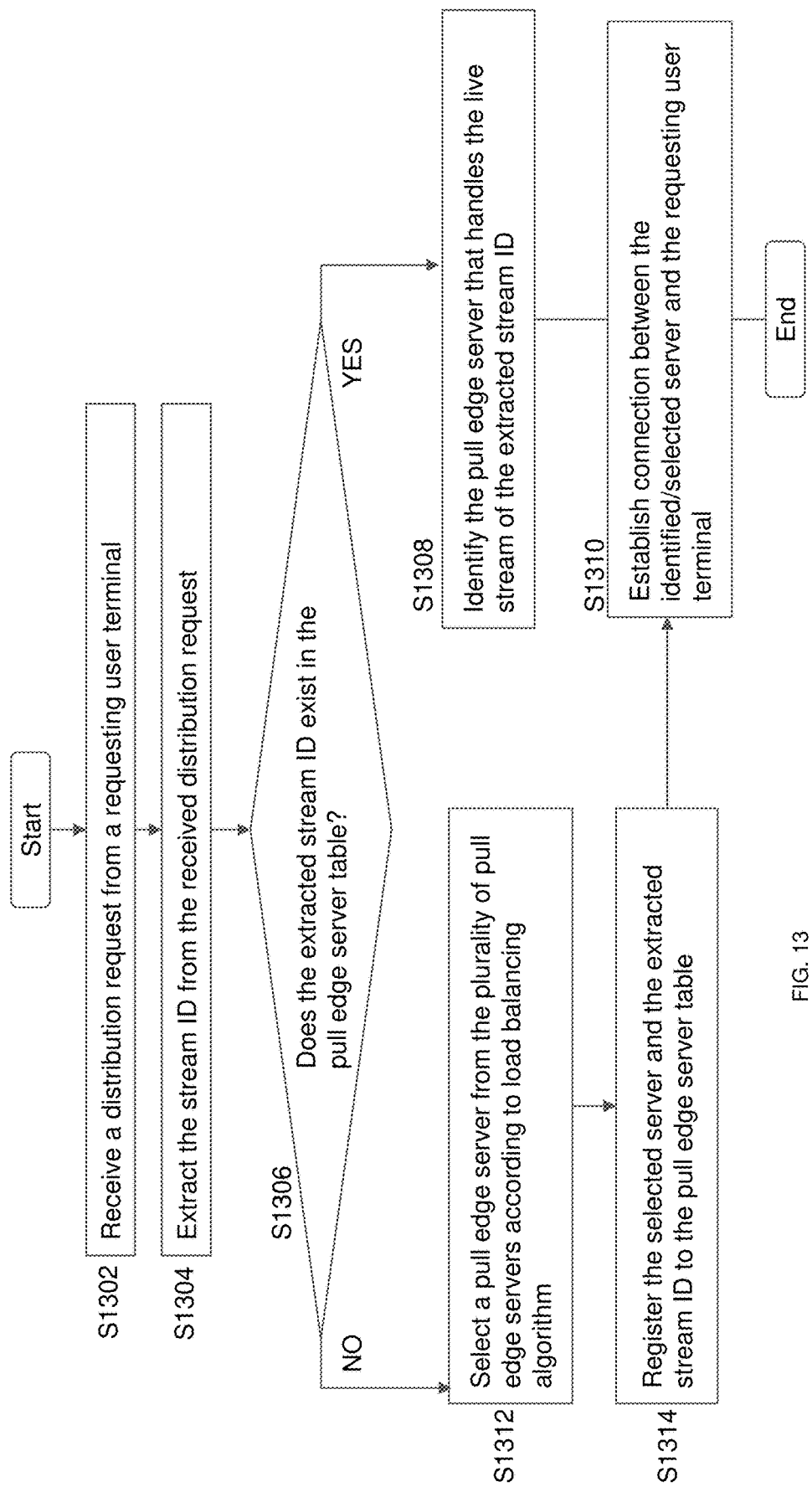
FIG. 13 depicts a flowchart showing exemplary processes implemented in the load balancer 50.

FIG. 13 depicts a flowchart showing exemplary processes implemented in the load balancer 50. At step S1302, the receiving unit 502 receives a distribution request from a requesting user terminal. At step S1304, the determining unit 504 extracts the stream ID from the received distribution request. At step S1306, the determining unit 504 refers to the pull edge server table to determine whether the extracted stream ID is stored in the pull edge server table. If the extracted stream ID is stored in the table (YES at step S1306), at step S1308, the determining unit 504 identifies the pull edge server that handles the live stream of the extracted stream ID. Specifically, the determining unit 504 identifies a pull edge server which corresponds to the extracted stream ID in the pull edge server table. As an example, in the example of FIG. 4, if the extracted stream ID is "S1", then the determining unit 504 identifies "SV1" as the pull edge server that handles the live stream of the extracted stream ID "S1". At step S1310, the connecting unit 506, by communicating with the identified pull edge server and the requesting user terminal via the network NW, establishes connection between the identified pull edge server and the requesting user terminal. Then the identified pull edge server starts sending the requesting user terminal the live streaming data for the requested live stream through the established connection.

If the extracted stream ID is not stored in the table (NO at step S1306), at step S1312, the determining unit 504 selects, by referring to the pull edge server table, a pull edge server from the plurality of pull edge servers according to load balancing algorithm. The algorithm may be based on the CPU usage or memory usage or the number of connections, as described above. At step S1314, the determining unit 504 registers the selected pull edge server and the extracted stream ID to the pull edge server table. As an example, in the example of FIG. 4, if the extracted stream ID is "S12" and a pull edge server "SV2" is selected at step S1312, the determining unit 504 adds the extracted stream ID "S12" to Stream ID cell corresponding to the server ID "SV2" in the pull edge server table.

At step S1310, the connecting unit 506, by communicating with the selected pull edge server and the requesting user terminal via the network NW, establishes connection between the selected pull edge server and the requesting user terminal. Then the selected pull edge server requests the live streaming data for the requested live stream from the origin server 70. The origin server 70 provides the selected pull edge server with the live streaming data. The selected pull edge server then starts sending the requesting user terminal the live streaming data for the requested live stream through the established connection.

In the example of FIG. 13, the identification of the pull edge server at step S1308 is performed irrespectively of other server status such as CPU usage or memory usage. However, in another embodiment, the determining unit may take the server status into account in addition to the extracted stream ID when identifying the pull edge server. For example, the determining unit may first identify a pull edge server handling the live stream of the extracted stream ID. The determining unit then determines whether the number of connections of the identified pull edge server exceeds a threshold value. If it exceeds, the determining unit may cancel the identification and the process may proceed to step S1312. If it does not exceed, the process may proceed to step S1310. This variation is beneficial when a live stream of a famous streamer is conducted and a huge number of viewers request access to the live stream at the same time. The number of connections of each pull edge server is kept lower than the threshold value, so there is less risk of overloading the pull edge servers.

According to the above embodiment, connections with user terminals for a specific live streaming are concentrated at a specific pull edge server. Therefore, the number of connections for the specific live streaming between the origin server 70 and the pull edge servers can be kept as low as possible, which is beneficial to prevent overload of the origin server 70.

In some embodiments, viewers A, B and C in FIG. 2 and FIG. 3 correspond to the user terminal 30 in FIG. 5. In some embodiments, the load balancer 50 may be implemented as part of the origin server 70 or the pull edge server 62, 64 or 66 or the control server in FIG. 11. In some embodiments, the pull edge servers 62, 64 and 66 in FIG. 11 may be implemented as part of the origin server 70 or the control server 100 in FIG. 11.

In some embodiments, once a streamer quits live streaming, the origin server 70 may detect termination of the live streaming. The origin server 70 may send a termination request including a stream ID of the terminated live streaming to the load balancer 50. The load balancer 50 may, in response to receiving the termination request, update the pull edge server table so that the stream ID included in the termination request is deleted from the table.

TCP and UDP are protocols in the transport layer used for sending bits of data, or packets, over the Internet. Both protocols use the IP protocol, which means that a packet sent by either TCP or UDP will be sent to an IP address.

TCP is a connection oriented protocol which features built-in error recovery and retransmission. However, all the back-and-forth communication reordering packets and ensuring complete delivery of the packets introduces latency.

UDP delivers a faster stream of information by eliminating error checking. Packets are sent directly to the recipient without having to properly order or retransmit them. Rather than waiting for confirmation of a successful transmission, the sender keeps transmitting packets, therefore the communication can be performed with a lower latency. It is desirable to utilize UDP in real time data accessing, such as live streaming data accessing.

In some embodiments, a deployment of mixed protocols may be utilized, wherein TCP is first used to establish the connection between a client and a server, and UDP is subsequently used for data transmission.

Figure 14:
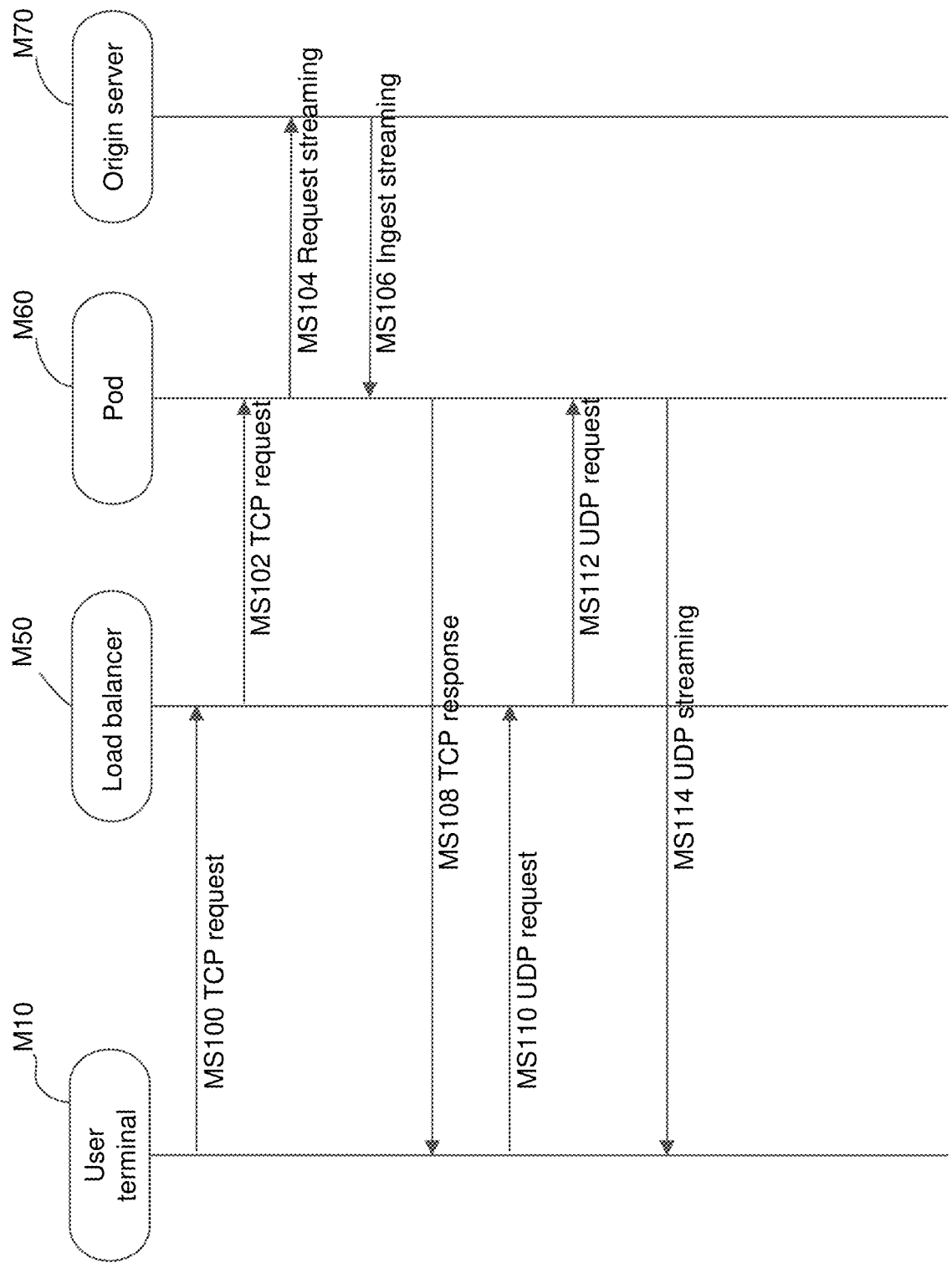
FIG. 14 shows an exemplary sequence chart illustrating an operation of data accessing with mixed protocols.

FIG. 14 shows an exemplary sequence chart illustrating an operation of data accessing with mixed protocols. The user terminal M10 (or the client) is a device of a user, who could be a viewer or a streamer. The load balancer M50 is configured to distribute or direct a request from a user terminal to a destination, which could be a server or a space in a server on the Internet. The pod M60 is a space or a virtual machine of a server (such as a pull edge server) in a cluster, which could be a Kubernetes cluster, for example. The origin server M70 is a server configured to store data to be accessed.

In step MS100, the user terminal M10 transmits a TCP request for streaming data to the load balancer M50.

In step MS102, the load balancer M50 distributes or directs the TCP request to the pod M60.

In step MS104, the pod M60 requests the streaming data from the origin server M70 wherein the streaming data is stored.

In step MS106, the origin server M70 ingests the streaming data to the pod M60.

In step MS108, the pod M60 transmits a TCP response to the user terminal M10. The TCP response may include a session description protocol (SDP) related to the streaming data.

In step MS110, the user terminal M10 transmits a UDP request for the streaming data to the load balancer M50.

In step MS112, the load balancer M50 distributes or directs the UDP request to the pod M60.

In step MS114, the pod M60 transmits the streaming data, which was ingested from the origin server M70, to the user terminal M10.

Note that there is only one pod (pod M60) in the deployment of FIG. 14, therefore, in step 112, the load balancer M50 can transmit the UDP request to the correct destination (which is pod M60) wherein the streaming data is ingested. However, when there are more than one pod in the deployment and a mixed-protocol (such as TCP+UDP) strategy is utilized, there would be a risk of sending the UDP request to the wrong destination by a load balancer.

Figure 15:
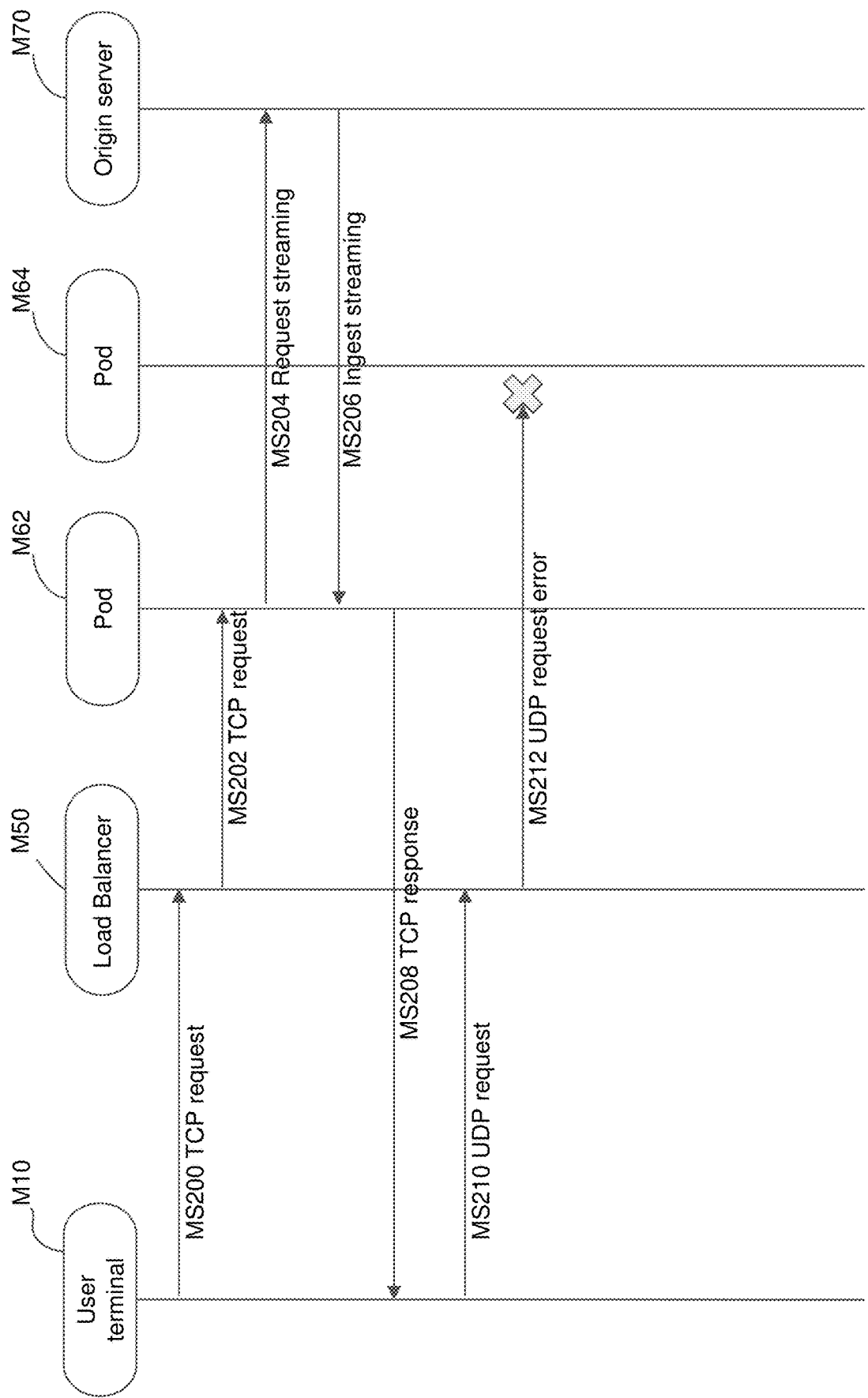
FIG. 15 shows an exemplary sequence chart illustrating an operation of data accessing with mixed protocols.

FIG. 15 shows another exemplary sequence chart illustrating an operation of data accessing with mixed protocols. There are two pods, pod M62 and pod M64, in the deployment of FIG. 15.

In step MS200, the user terminal M10 transmits a TCP request for streaming data to the load balancer M50.

In step MS202, the load balancer M50 distributes or directs the TCP request to the pod M62. The distribution may be done by a criterion predetermined for the load balancer M50 to determine which pod to assign a request to.

In step MS204, the pod M62 requests the streaming data from the origin server M70 wherein the streaming data is stored.

In step MS206, the origin server M70 ingests the streaming data to the pod M62.

In step MS208, the pod M62 transmits a TCP response to the user terminal M10. The TCP response may include a session description protocol (SDP) related to the streaming data.

In step MS210, the user terminal M10 transmits a UDP request for the streaming data to the load balancer M50.

In step MS212, the load balancer M50 is supposed to direct the UDP request to the pod M62 wherein the requested streaming data is ingested. However, because the load balancer M50 cannot correctly match or synchronize the former TCP request and the current UDP request, a session affinity may not be established successfully. Therefore, there is a risk of sending the UDP request to the wrong pod wherein the requested streaming data does not exist, as illustrated in FIG. 15. Therefore, the data accessing cannot be completed successfully. The failure rate may increase as more pods are implemented in the deployment. This issue of sending a UDP request to the wrong destination may happen in various cluster systems, such as a Kubernetes cluster system, when mixed protocols are incorporated. In some embodiments, the load balancer M50, the pod M62, the pod M64, and the origin server M70 are implemented in a Kubernetes cluster system.

Conventionally, there is also no way for a user terminal to directly access a pod within a cluster, because there is no information about a location or address of the pod that is known to the user terminal. Conventionally, due to concerns such as safety issues, there is no address information of a pod that is publicly known or known to an entity outside of a cluster wherein the pod resides.

Figure 16:
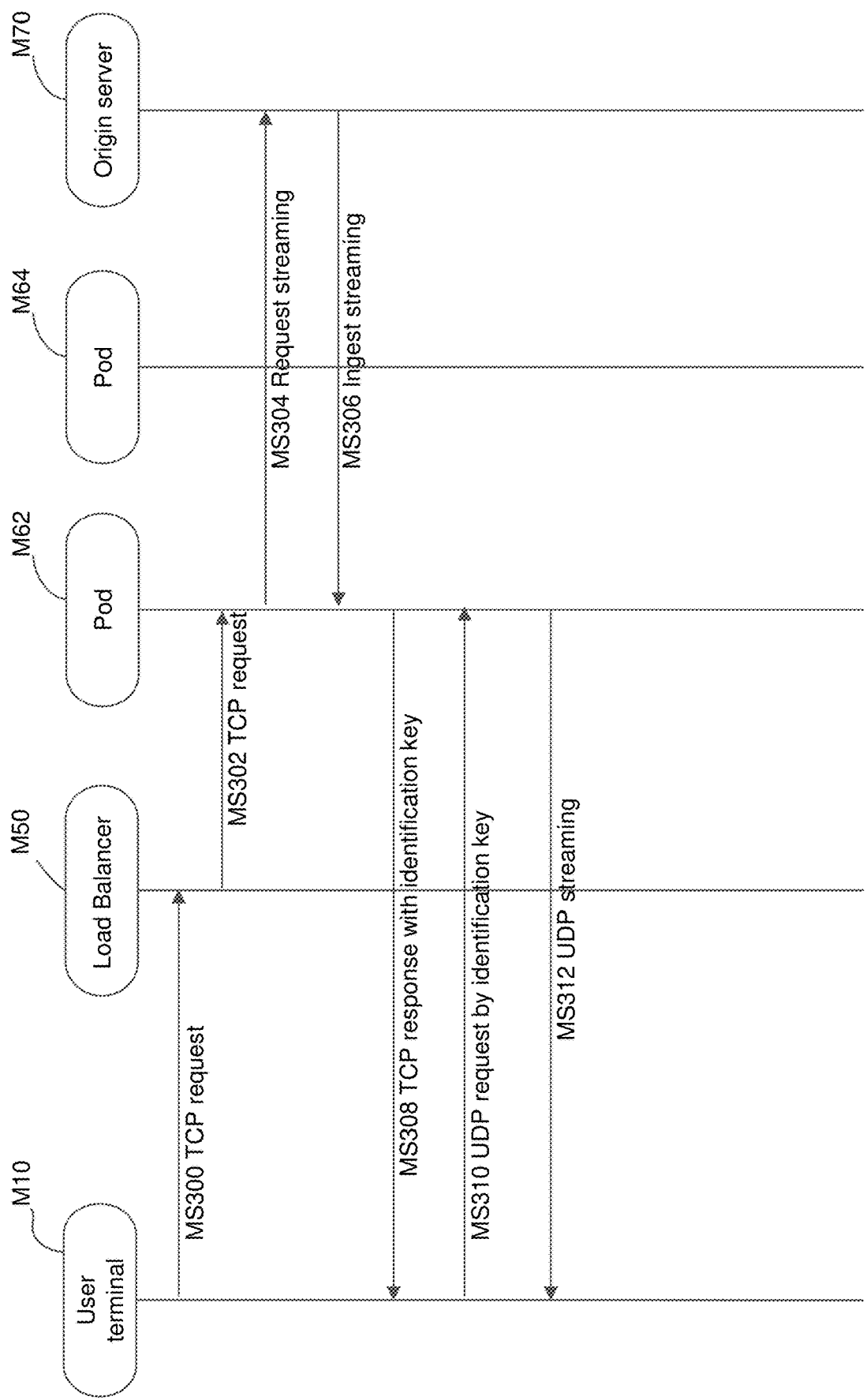
FIG. 16 shows an exemplary sequence chart illustrating an operation of data accessing with mixed protocols in accordance with some embodiments of the present disclosure.

FIG. 16 shows an exemplary sequence chart illustrating an operation of data accessing with mixed protocols in accordance with some embodiments of the present disclosure.

In step MS300, the user terminal M10 transmits a TCP request for streaming data to the load balancer M50.

In step MS302, the load balancer M50 distributes or directs the TCP request to the pod M62. The distribution may be done by a criterion predetermined for the load balancer M50 to determine which pod to assign a request to. The pod M62 obtains the TCP request.

In step MS304, the pod M62 requests the streaming data from the origin server M70 wherein the streaming data is stored.

In step MS306, the origin server M70 ingests the streaming data to the pod M62.

In step MS308, the pod M62 transmits or replys a TCP response to the user terminal M10. The user terminal M10 obtains the TCP response. The TCP response contains an identification key of the pod M62 or generated for the pod M62. The identification key is configured to let an entity outside the cluster, wherein the pod M62 resides, to access the pod M62. The pod M62 is addressable by the identification key. The identification key may include or correspond to IP information, node information, pod information or port information of the pod M62. The identification key may be included in an SDP.

In step MS310, the user terminal M10 transmits a UDP request for the streaming data directly to the pod M62 by the identification key.

In step MS312, the pod M62 transmits the streaming data to the user terminal M10. Therefore, the user terminal M10 obtains the streaming data successfully.

In this embodiment, an identification key is created for a pod within a cluster. The identification key is transmitted to a user terminal outside the cluster in a TCP response. Subsequently, the user terminal utilizes the identification key to bypass a load balancer and to send a UDP request directly to the correct pod to access the streaming data. The exemplary embodiment shown in FIG. 16 can effectively solve the issue of sending a UDP request to a wrong destination in a mixed-protocol deployment. In some embodiments, the identification key may be created by including a corresponding IP information, node information, pod information or port information in an Interactive Connectivity Establishment (ICE) information, such as a WebRTC ICE. The ICE information may be included in a TCP response.

Conventionally, if the accessed data is not streaming data or live video data, it may not cause an error if a TCP request and a subsequent UDP are sent to different destinations. Therefore, if the accessed data is not streaming data or live video data, there may not be a need to create an identification key for a space (such as a pod in a Kubernetes cluster) even if mixed protocols are implemented.

In some embodiments, an additional server, such as a CDN server or a catch server, may be implemented between a user terminal and a load balancer. In some embodiments, an additional server, such as a CDN server or a catch server, may be implemented between a user terminal and a pod.

In some embodiments, a user terminal can be viewed as a system comprising one or a plurality of processors, wherein the one or plurality of processors execute a machine-readable instruction to perform processes, such as the data accessing processes described above.

In some embodiments, a pod, an origin server, and/or a load balancer belong to a system providing a streaming service. In some embodiments, a pod is implemented on a streaming server. In some embodiments, an origin server serves as a streaming server. In some embodiments, the streaming service can be accessed by an application operating on a user terminal such as a smartphone or a tablet.

Referring to FIG. 16, in some embodiments, the streaming data may not be ingested from the origin server M70 to the pod M62 in step MS306. Instead, the origin server M70 may first transfer metadata to the pod M62 in step MS306, and later ingest the streaming data to the pod M62 after a UDP request is received at the pod M62 (for example, after step MS310).

Figure 17:
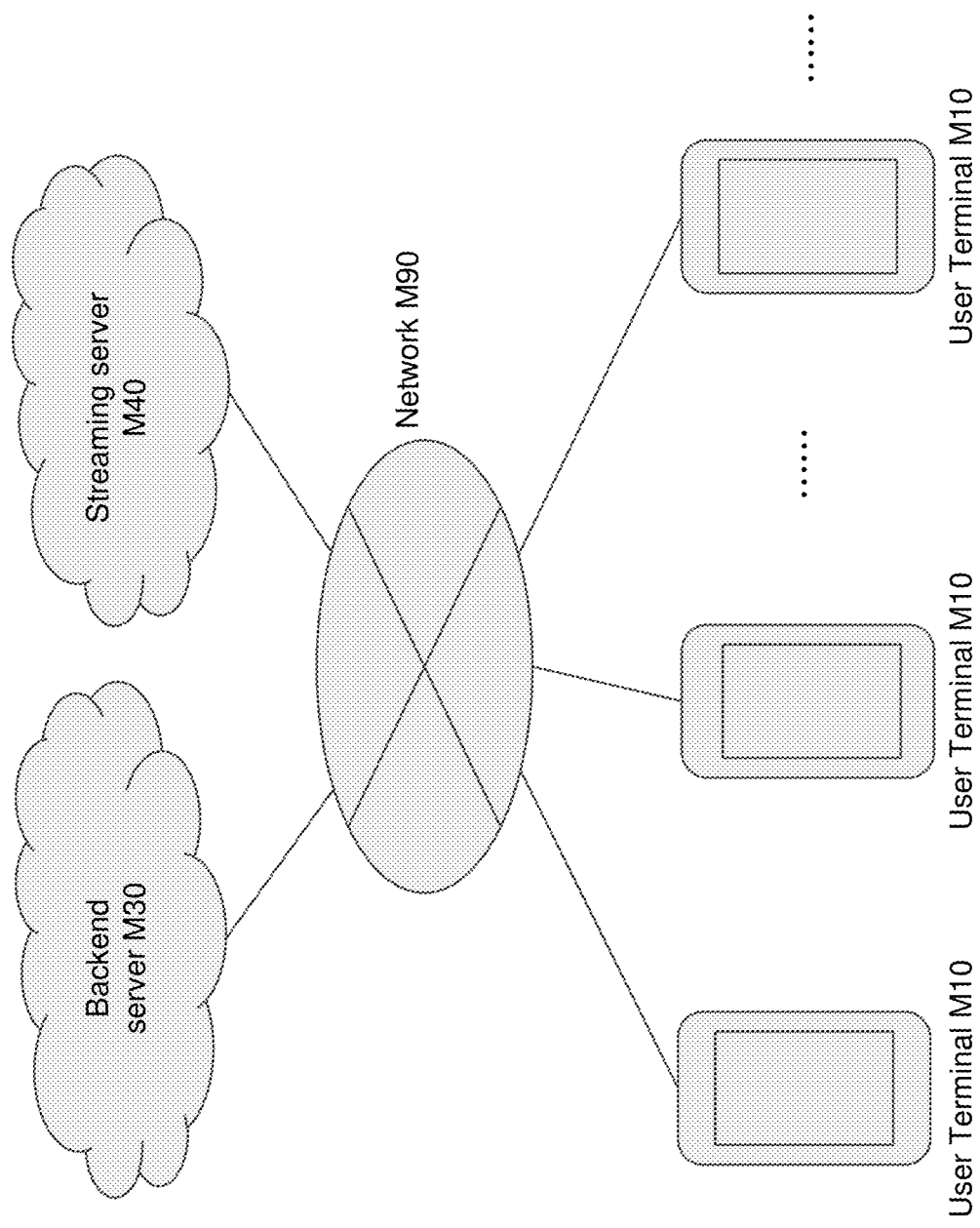
FIG. 17 shows a schematic configuration of a communication system in accordance with some embodiments of the present disclosure.

FIG. 17 shows a schematic configuration of a communication system according to some embodiments of the present disclosure.

The communication system M1 may provide a live streaming service with interaction via a content. Here, the term "content" refers to a digital content that can be played on a computer device. In other words, the communication system M1 enables a user to participate in real-time interaction with other users on-line. The communication system M1 includes a plurality of user terminals 10, a backend server M30, and a streaming server M40. The user terminals 10, the backend server M30 and the streaming server M40 are connected via a network M90, which may be the Internet, for example. The backend server M30 may be a server for synchronizing interaction between the user terminals and/or the streaming server M40. In some embodiments, the backend server M30 may be referred to as the server of an application (APP) provider. The streaming server M40 is a server for handling or providing streaming data or video data. In some embodiments, the backend server M30 and the streaming server M40 may be independent servers. In some embodiments, the backend server M30 and the streaming server M40 may be integrated into one server. In some embodiments, the user terminals 10 are client devices for the live streaming. In some embodiments, the user terminal M10 may be referred to as viewer, streamer, anchor, podcaster, audience, listener or the like. Each of the user terminal M10, the backend server M30, and the streaming server M40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

DESCRIPTION OF REFERENCE NUMERALS 1 communication system
10 server system
20 user terminal
30, 30a, 30b user terminal
LV distributor
AU1, AU2 viewer
VD, VD1, VD2 video image
NW network
30 user terminal
100 distribution unit
102 image capturing control unit
104 audio control unit
106 video transmission unit
108 distributor-side UI control unit
200 viewing unit
202 viewer-side UI control unit
204 superimposed information generation unit
206 input information transmission unit
302 distribution information providing unit
304 relay unit
306 gift processing unit
308 payment processing unit
310 stream DB
312 user DB
314 gift DB
50 load balancer
502 receiving unit
504 determining unit
506 connecting unit
70 origin server
90 network
62, 64, 66 pull edge server
100 control server
S100, S102, S104, S106, S108, S110, S112, S114 step
S116, S118, S120, S122, S124, S126, S128, S130, S132, S134 step
S200, S202, S204, S206, S208, S210 step
S212, S214, S216, S218, S220, S222 step
S300, S302, S304, S306, S308, S310, S312, S314 step
S316, S318, S320, S322, S324, S326, S328 step
S1300, S1302, S1304, S1306, S1308, S1310, S1312, S1314 step
M1 Communication system
M10 User terminal
M30 Backend server
M40 Streaming server
M50 Load balancer
M60 Pod
M62 Pod
M64 Pod
M70 Origin server
M90 Network
MS100, MS102, MS104, MS106, MS108, MS110, MS112, MS114 step
MS200, MS202, MS204, MS206, MS208, MS210, MS212 step
MS300, MS302, MS304, MS306, MS308, MS310, MS312 step The present techniques will be better understood with reference to the following enumerated embodiments:

A1. A method for accessing streaming data, executed by a load balancer, comprising: obtaining, from a first user terminal and via a network, a first request for streaming data; transmitting the first request to a server for accessing the streaming data;
  recording identification information included in the first request to be corresponding to the server in a table;
  obtaining, from a second user terminal and via a network, a second request for the streaming data; and
  transmitting the second request to the server for accessing the streaming data, wherein identification information included in the second request is the same as the identification information included in the first request.

A2. The method according to A1, wherein the streaming data is live streaming data.

A3. The method according to A1, further comprising:
  determining the identification information included in the second request to be the same as the identification information included in the first request by referring to the table.

A4. The method according to A1, wherein the second request is obtained while the streaming data is being accessed by the first user terminal through the server.

A5. The method according to A1, wherein the identification information of the streaming data is a distributor ID identifying a distributor of the streaming data.

A6. The method according to A1, wherein the identification information of the streaming data is a stream ID identifying the streaming data.

A7. The method according to A6, wherein the server is a pull edge server ingested with the streaming data from an origin server, and the origin server receives the streaming data from a user terminal of a distributor providing the streaming data.

A8. The method according to A1, wherein the streaming data is transcoded at the server before being transmitted to the first user terminal.

A9. The method according to A1, further comprising:
  determining a number of user terminals connected to the server to be less than a threshold value before transmitting the second request to the server for accessing the streaming data.

A10. A system for accessing streaming data, comprising one or a plurality of processors,
  wherein the one or plurality of processors execute a machine-readable instruction to perform: obtaining, from a first user terminal and via a network, a first request for streaming data; transmitting the first request to a server for accessing the streaming data;
  recording identification information included in the first request to be corresponding to the server in a table;
  obtaining, from a second user terminal and via a network, a second request for the streaming data; and
  transmitting the second request to the server for accessing the streaming data,
  wherein identification information included in the second request is the same as the identification information included in the first request.

A11. A load balancer for live streaming data, comprising:
a storing unit configured to store a stream ID which identifies a currently available live stream and a respective server ID which identifies a server handling the currently available live stream;
a receiving unit configured to receive, from a terminal of a user and via a network, a request including a first stream ID;
a determining unit configured to determine, in response to receiving the request and by referring to the storing unit, a first server handling a first live stream which is identified by the first stream ID; and
a connecting unit configured to cause the determined first server to send live streaming data for the first live stream to the terminal of the user.

B1. A method for streaming data accessing, comprising:
transmitting a TCP request for streaming data;
obtaining a TCP response containing an identification key;
transmitting a UDP request for the streaming data to a space addressable by the identification key; and
obtaining the streaming data.

B2. The method according to B1, wherein the TCP request is transmitted to a load balancer.

B3. The method according to B2, further comprising directing the TCP request, by the load balancer, to the space addressable by the identification key.

B4. The method according to B1, wherein the UDP request is transmitted directly to the space addressable by the identification key.

B5. The method according to B1, wherein the space corresponds to a pod in a Kubenetes cluster.

B6. The method according to B5, further comprising creating the identification key for the space, wherein the identification key is configured to be utilized by a user terminal outside the Kubernetes cluster to access the space.

B7. The method according to B1, wherein the identification key includes IP information, node information, pod information or port information.

B8. A system for streaming data accessing, comprising one or a plurality of processors,
wherein the one or plurality of processors execute a machine-readable instruction to perform: transmitting a TCP request for streaming data;
obtaining a TCP response containing an identification key;
transmitting a UDP request for the streaming data to a space addressable by the identification key; and
obtaining the streaming data.

B9. A non-transitory computer-readable medium including a program for streaming data accessing, wherein the program causes one or a plurality of computers to execute:
transmitting a TCP request for streaming data;
obtaining a TCP response containing an identification key;
transmitting a UDP request for the streaming data to a space addressable by the identification key; and
obtaining the streaming data.

B10. A method for streaming data accessing, comprising:
obtaining a TCP request for streaming data;
replying a TCP response containing an identification key;
obtaining, at a space addressable by the identification key, a UDP request for the streaming data; and
transmitting the streaming data.

B11. The method according to B10, further comprising creating the identification key for the space, wherein the space corresponds to a pod in a Kubernetes cluster, and the identification key is configured to be utilized by a user terminal outside the Kubernetes cluster to access the space.

What is claimed is:

1. A method for accessing streaming data, executed by a load balancer and a plurality of pull edge servers, comprising:
obtaining, by the load balancer and from a first user terminal and via a network, a first request including identification information identifying the streaming data;
transmitting, by the load balancer, the first request to a first pull edge server of the plurality of pull edge servers for accessing the streaming data;
recording, by the load balancer, the identification information included in the first request to be corresponding to the first pull edge server in a table;
obtaining, by the first pull edge server, the streaming data from an origin server;
transmitting, by the first pull edge server, the streaming data to the first user terminal;
obtaining, by the load balancer and from a second user terminal and via the network, a second request including the identification information;
determining, by the load balancer, the identification information included in the second request to be the same as the identification information included in the first request by referring to the table;
in response to the determination that the identification information included in the second request is the same as the identification information included in the first request, determining, by the load balancer, a number of user terminals connected to the first pull edge server to be less than a threshold by referring to connection data of the first pull edge server, the first pull edge server being selected by referring to the table;
in response to the determination that the number of user terminals connected to the first pull edge server is less than the threshold, transmitting, by the load balancer, the second request to the first pull edge server for accessing the streaming data; and
transmitting, by the first pull edge server, the streaming data to the second user terminal.

2. The method according to claim 1, wherein the streaming data is live streaming data.

3. The method according to claim 1, wherein the second request is obtained by the load balancer while the streaming data is being accessed by the first user terminal through the first pull edge server.

4. The method according to claim 1, wherein the identification information of the streaming data is a distributor ID identifying a distributor of the streaming data.

5. The method according to claim 1, wherein the identification information of the streaming data is a stream ID identifying the streaming data.

6. The method according to claim 5, wherein the origin server receives the streaming data from a user terminal of a distributor providing the streaming data.

7. The method according to claim 1, further comprising:
transcoding, by the first pull edge server, the streaming data, such that an audio data in the streaming data is transformed from a first format into a second format, wherein the streaming data transmitted by the first pull edge server to the first user terminal and the second user terminal is a transcoded version of the streaming data.

8. A system for accessing streaming data, comprising a load balancer and a plurality of pull edge servers, wherein a processor of the load balancer and the plurality of pull edge servers executes at least one machine-readable program to perform:
- obtaining, by the load balancer and from a first user terminal and via a network, a first request including identification information identifying the streaming data;
- transmitting, by the load balancer, the first request to a first pull edge server of the plurality of pull edge servers for accessing the streaming data;
- recording, by the load balancer, the identification information included in the first request to be corresponding to the first pull edge server in a table;
- obtaining, by the first pull edge server, the streaming data from an origin server;
- transmitting, by the first pull edge server, the streaming data to the first user terminal;
- obtaining, by the load balancer and from a second user terminal and via the network, a second request including the identification information;
- determining, by the load balancer, the identification information included in the second request to be the same as the identification information included in the first request by referring to the table;
- in response to the determination that the identification information included in the second request is the same as the identification information included in the first request,
- determining, by the load balancer, a number of user terminals connected to the first pull edge server to be less than a threshold by referring to connection data of the first pull edge server, the first pull edge server being selected by referring to the table;
- in response to the determination that the number of user terminals connected to the first pull edge server is less than the threshold, transmitting, by the load balancer, the second request to the first pull edge server for accessing the streaming data; and
- transmitting, by the first pull edge server, the streaming data to the second user terminal.

* * * * *